(12) United States Patent
Weinhardt

(10) Patent No.: US 11,280,404 B2
(45) Date of Patent: Mar. 22, 2022

(54) HYDRAULIC SYSTEM FOR AN AUTOMATIC TRANSMISSION OF A MOTOR VEHICLE

(71) Applicant: AUDI AG, Ingolstadt (DE)

(72) Inventor: Mathias Weinhardt, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 568 days.

(21) Appl. No.: 16/317,846

(22) PCT Filed: Aug. 1, 2017

(86) PCT No.: PCT/EP2017/069447
§ 371 (c)(1),
(2) Date: Jan. 15, 2019

(87) PCT Pub. No.: WO2018/024730
PCT Pub. Date: Feb. 8, 2018

(65) Prior Publication Data
US 2019/0234514 A1    Aug. 1, 2019

(30) Foreign Application Priority Data

Aug. 3, 2016 (DE) ................. 10 2016 214 370.0

(51) Int. Cl.
*F16H 61/12* (2010.01)
*F15B 19/00* (2006.01)
(Continued)

(52) U.S. Cl.
CPC ............ *F16H 61/12* (2013.01); *F15B 1/033* (2013.01); *F15B 11/20* (2013.01); *F15B 19/005* (2013.01);
(Continued)

(58) Field of Classification Search
None
See application file for complete search history.

(56) References Cited

U.S. PATENT DOCUMENTS 6,546,826 B2 * 4/2003 Suzuki ............... F16H 61/0031
74/335
7,380,528 B2 * 6/2008 Gaessler .................. F01L 9/10
123/90.12
(Continued)

FOREIGN PATENT DOCUMENTS

CN    102910161 A    2/2013
CN    104879489 A    9/2015
(Continued)

OTHER PUBLICATIONS

Office Action dated Dec. 26, 2019, in corresponding Chinese Application No. 201780046319.X; 18 pages.
(Continued)

*Primary Examiner* — Michael Leslie
(74) *Attorney, Agent, or Firm* — Maier & Maier, PLLC

(57) ABSTRACT

A hydraulic system for an automatic transmission of a motor vehicle, with which hydraulic cylinders of at least one clutch and of gear selectors can be actuated, which hydraulic system has a pressure accumulator for providing an accumulator pressure in the hydraulic system, wherein a clutch valve that can be actuated by the control unit is arranged in a clutch path leading from the pressure accumulator to the clutch hydraulic cylinder.

13 Claims, 16 Drawing Sheets

(51) Int. Cl.
   *F16H 61/688* (2006.01)
   *F15B 1/033* (2006.01)
   *F15B 11/20* (2006.01)
   *F16H 61/00* (2006.01)
   *G07C 5/08* (2006.01)
   *F16H 59/68* (2006.01)

(52) U.S. Cl.
   CPC ....... *F16H 61/0021* (2013.01); *F16H 61/688* (2013.01); *G07C 5/085* (2013.01); *G07C 5/0808* (2013.01); *F15B 2211/212* (2013.01); *F15B 2211/71* (2013.01); *F15B 2211/855* (2013.01); *F15B 2211/857* (2013.01); *F15B 2211/87* (2013.01); *F16H 2059/683* (2013.01); *F16H 2061/0034* (2013.01); *F16H 2061/1208* (2013.01); *F16H 2061/1264* (2013.01)

(56) References Cited

U.S. PATENT DOCUMENTS

| | | | | |
|---|---|---|---|---|
| 8,740,748 | B2* | 6/2014 | Moorman | F16D 48/0206 477/174 |
| 9,366,269 | B2* | 6/2016 | Chen | F15B 1/033 |
| 9,709,160 | B2* | 7/2017 | Bartl | F16H 61/688 |
| 10,508,666 | B2* | 12/2019 | Weinhardt | F15B 1/033 |
| 2013/0035835 | A1 | 2/2013 | Hachtel et al. | |
| 2015/0247571 | A1 | 9/2015 | Ammler | |
| 2016/0003347 | A1* | 1/2016 | Bartl | F16H 61/688 74/335 |
| 2019/0178371 | A1* | 6/2019 | Weinhardt | F15B 19/005 |
| 2021/0356038 | A1* | 11/2021 | Weinhardt | F16H 61/12 |
| 2021/0372521 | A1* | 12/2021 | Weinhardt | F15B 19/005 |
| 2021/0381590 | A1* | 12/2021 | Weinhardt | F16H 61/30 |
| 2021/0381591 | A1* | 12/2021 | Weinhardt | F16H 61/0021 |

FOREIGN PATENT DOCUMENTS

| | | |
|---|---|---|
| DE | 10138777 A1 | 2/2003 |
| DE | 10143830 A1 | 3/2003 |
| DE | 10310300 A1 | 9/2004 |
| DE | 102011100800 A1 | 11/2012 |
| DE | 102013003894 A1 | 9/2014 |
| DE | 112013001599 T5 | 12/2014 |
| DE | 102014003083 A1 | 9/2015 |
| WO | 0214825 A1 | 2/2002 |

OTHER PUBLICATIONS

Examination Report dated Apr. 7, 2017 in corresponding German Application No. 10 2016 214 370.0; 10 pages.

Search Report and Written Opinion dated Nov. 7, 2017 in corresponding International Application No. PCT/EP2017/069447; 22 pages.

Office Action dated Jul. 6, 2020 in corresponding Chinese Application No. 201780046319.X; 12 pages including English-language translation.

Notification of Transmittal of Translation of the International Preliminary Report on Patentability dated Feb. 14, 2019, in connection with corresponding international Application No. PCT/EP2017/069447 (9 pgs.).

* cited by examiner

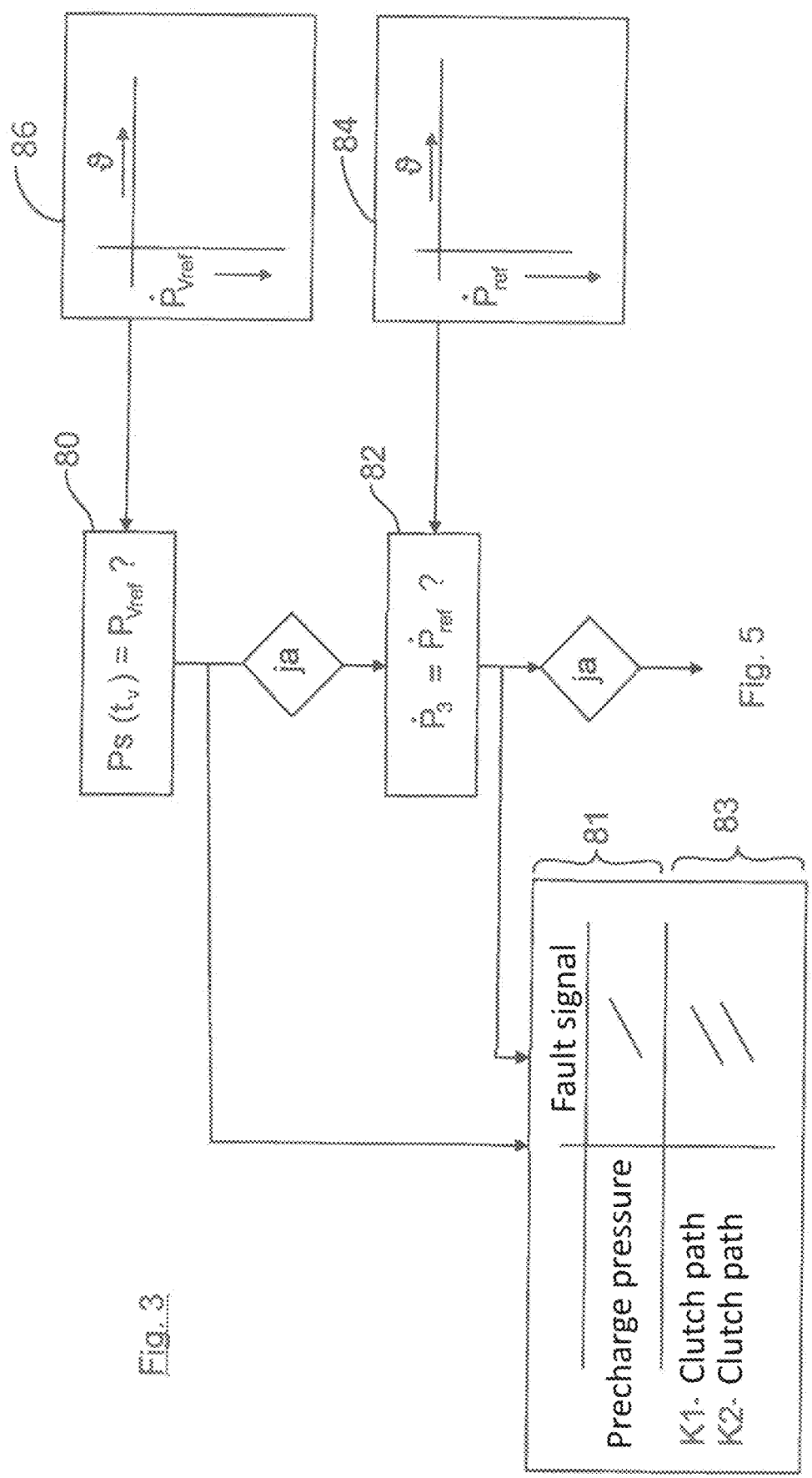

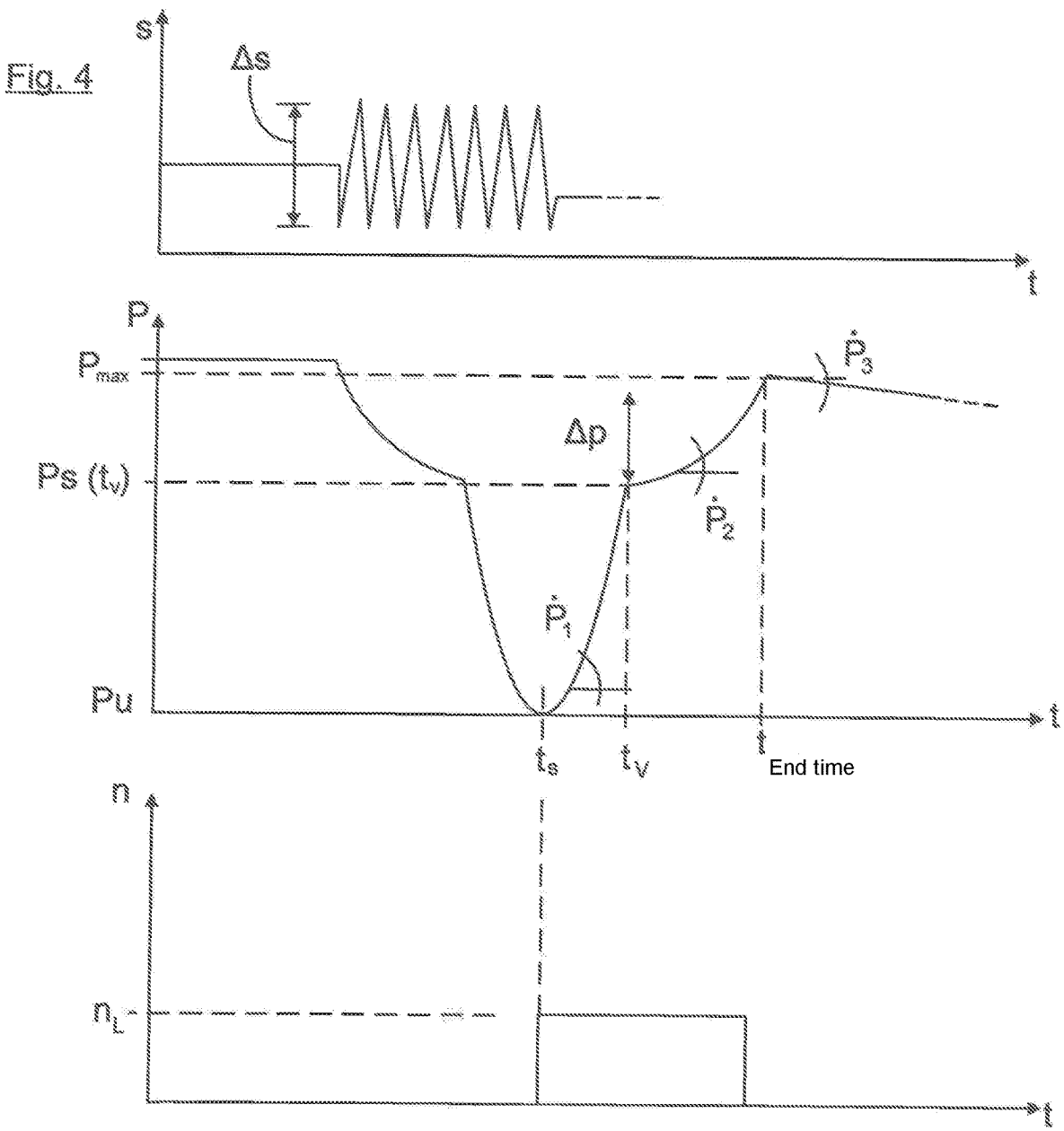

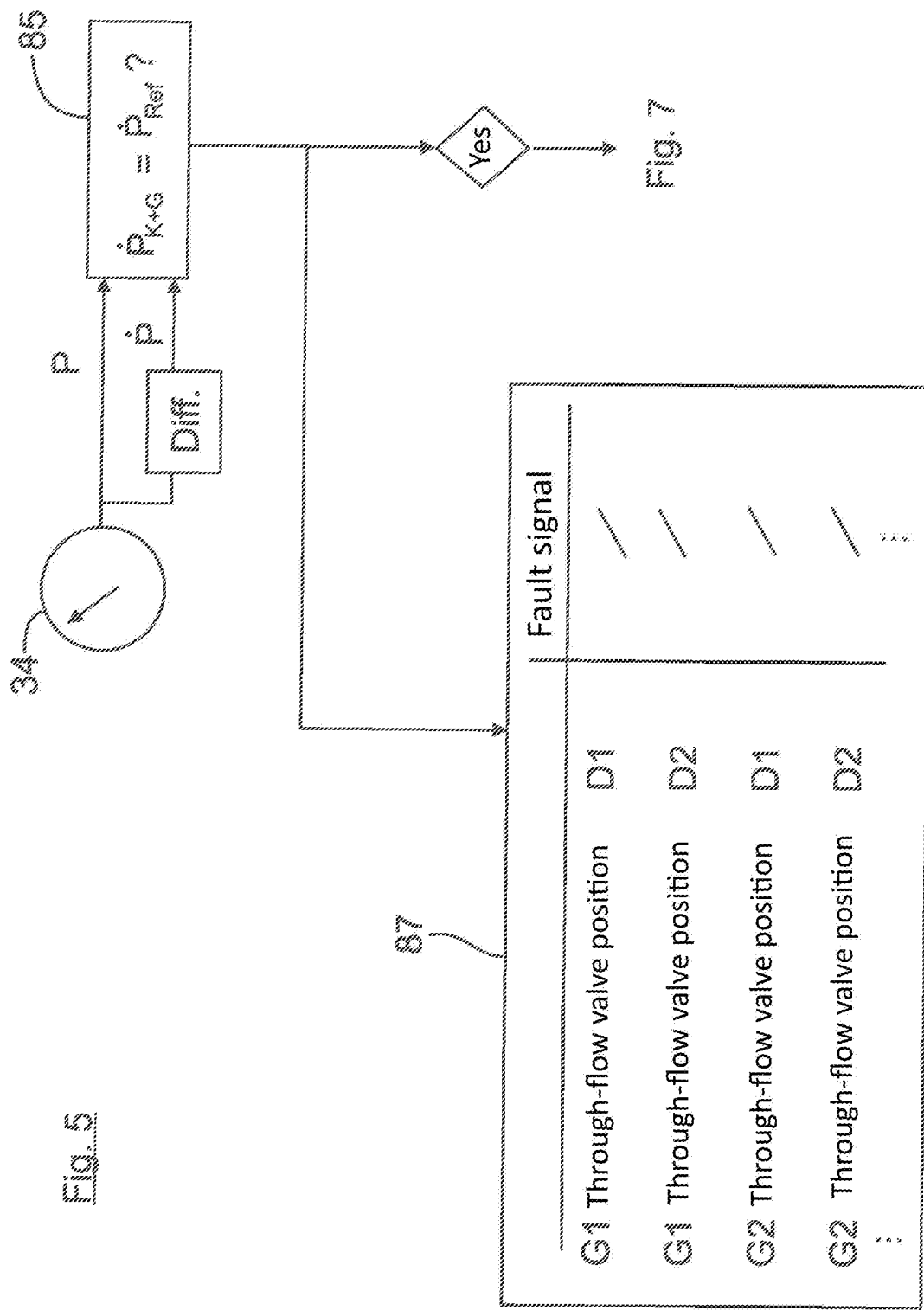

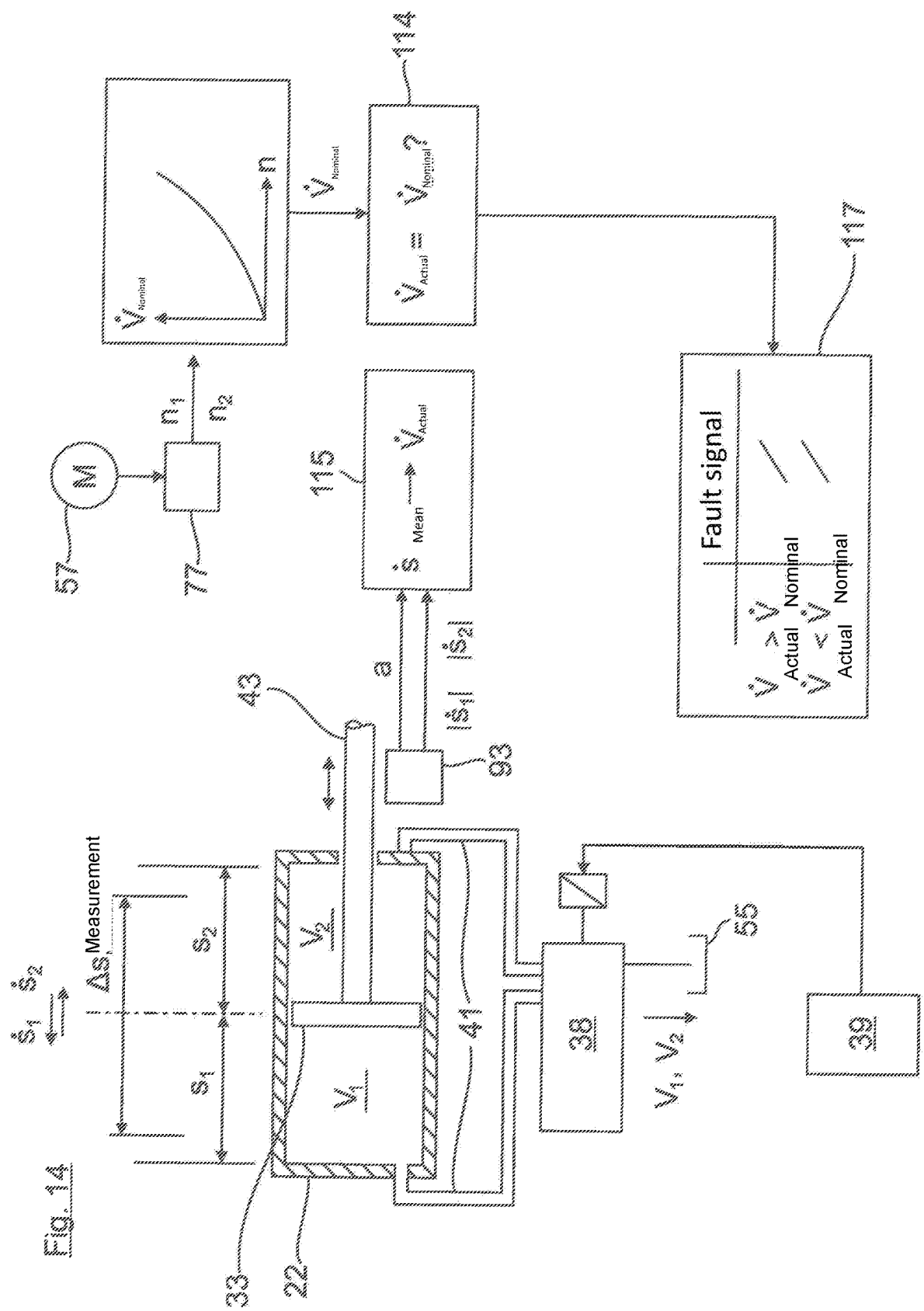

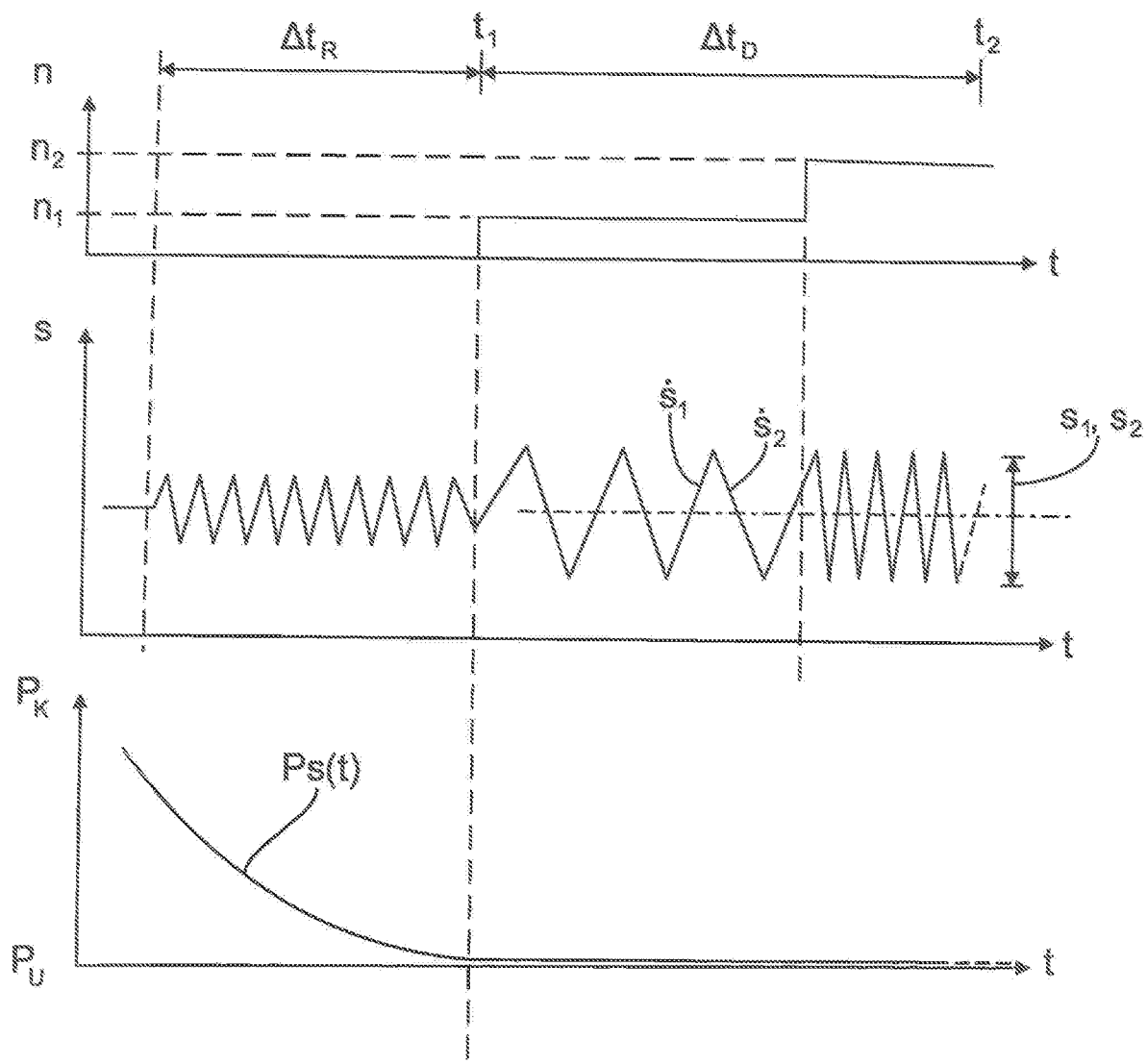

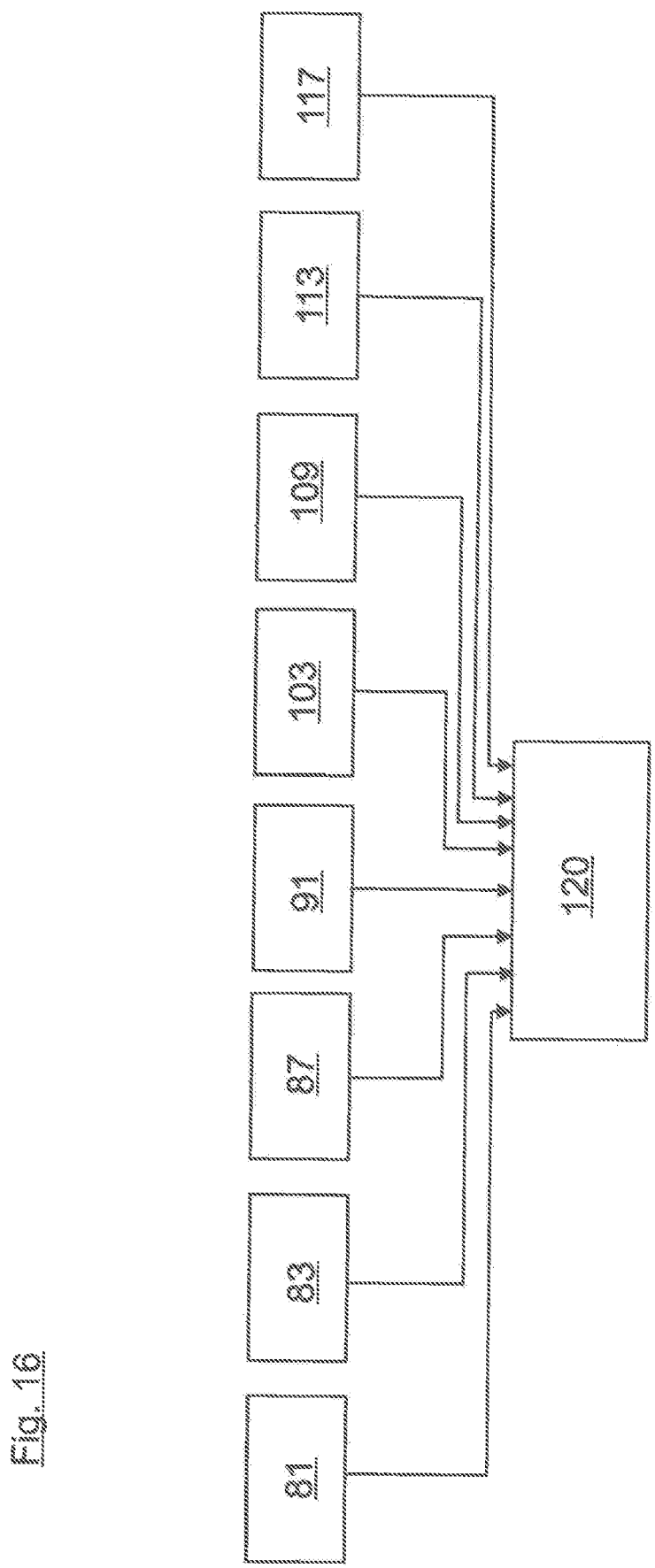

HYDRAULIC SYSTEM FOR AN AUTOMATIC TRANSMISSION OF A MOTOR VEHICLE

FIELD

The invention relates to a hydraulic system for an automatic transmission, especially a dual clutch transmission, of a motor vehicle.

BACKGROUND

In a dual clutch transmission, a fully automatic gear shifting with no interruption in the traction force is made possible by means of two partial transmissions. The torque transmission is produced via one of two clutches, which connects the two partial transmissions to the drive unit. The clutches as well as the gear selectors for engaging the gears are activated by way of hydraulic cylinders, which are hydraulically actuatable by way of a hydraulic system.

From DE 10 2014 003 083 A1 there is known a hydraulic system of the generic kind, having a pressure accumulator for providing an accumulator pressure in the hydraulic system. A control valve that can be actuated by an electronic control unit is arranged in a clutch path leading from the pressure accumulator to the clutch hydraulic cylinder, by which the hydraulic pressure applied at the clutch hydraulic cylinder can be adjusted. A pressure sensor is preferably coordinated with the control unit (DE 10 2013 003 894 A1), by which the hydraulic pressure applied at the clutch hydraulic cylinder can be detected. Furthermore, the hydraulic system has a charging hydraulic pump, which delivers hydraulic fluid to the hydraulic system in a charging process in order to boost the accumulator pressure.

The hydraulic system may furthermore comprise multiple gear selector paths, leading from the pressure accumulator to the gear selector hydraulic cylinder of the respective gear selector. In each of the gear selector paths there is arranged a gear selector valve actuatable by the control unit, with which the hydraulic pressure applied at the gear selector hydraulic cylinder in the respective gear selector path can be adjusted.

SUMMARY

The object of the invention is to provide a hydraulic system in which the operating security of the pressure accumulator can be assured with reduced expense for sensor technology.

The electronic control unit of the hydraulic system has a diagnosis module, with which a diagnosis of the gear selector path can be carried out, in which the diagnosis module checks a leakage behavior in the respective gear selector path using the pressure sensor arranged in the aforementioned at least one clutch path. The gear selector diagnosis can preferably be performed as a diagnosis following the aforementioned clutch path diagnosis in time. The gear selector diagnosis preferably takes place solely contingent upon whether at least one clutch path with a fault-free leakage is identified in a preceding clutch path diagnosis, to be described later. In this case, the pressure sensor in the clutch path identified as being fault-free (hereinafter, the reference clutch path) is used for the subsequent gear selector diagnosis.

For the gear selector path diagnosis, the diagnosis module opens the clutch valve situated in the reference clutch path so that the pressure sensor situated in the reference clutch path can detect an actual accumulator pressure curve. Furthermore, the diagnosis module opens a pressure regulating valve, which is located in a connection line leading to the gear selector, in order to produce a pressure connection between the pressure sensor situated in the reference clutch path and the gear selector valve situated in the gear selector path.

In a first diagnosis step, a diagnosis charging operation occurs, during which the actual accumulator pressure detected by the pressure sensor is increased up to an upper threshold value at which the charging hydraulic pump is switched off. After the end of the diagnosis charging operation, a third evaluating unit can detect a pressure gradient of the accumulator pressure curve via the pressure sensor and compare it to a reference pressure gradient and evaluate whether a fault-free or a fault-related pressure drop (that is, gear selector leakage) is present in the accumulator pressure curve.

In one technical implementation, the hydraulic system may comprise multiple parallelly switched gear selector paths, in which each time a gear selector valve is arranged, which can be moved between a blocking valve position and two through-flow valve positions.

In such a configuration, the gear selector path diagnosis may be performed separately in the gear selector path being checked for each of the through-flow valve positions and evaluated for freedom from faults. The gear selector valves in the gear selector paths not being checked, on the contrary, are all switched in the blocking valve position in order to heighten the measurement accuracy at the gear selector path being checked.

The aforementioned detecting of the pressure gradient in the accumulator pressure curve occurs within a measurement time interval. The start time thereof preferably lies immediately after the end of the diagnosis charging operation. Furthermore, during the measuring of the pressure gradient there also occurs a detecting of the actual accumulator pressure at the start time and at the measurement end time of the measurement time interval. By means of these two absolute pressure values, the diagnosis module can then identify a fault-free diagnosis when a sufficiently large accumulator pressure difference is present between the start and end time points.

The pressure accumulator of the hydraulic system may be designed as a piston-cylinder unit, having an oil chamber connected to the clutch path and a prestressed pressure piston to which a precharge pressure is applied. The prestressing is accomplished, for example, by a gas pressure or alternatively by a spring. When the oil chamber is completely empty, the pressure piston is pushed with a prestressing force against a mechanical end stop in the pressure accumulator. In such a completely empty condition, the clutch path is not subjected to pressure. Instead, in this case there prevails in the clutch path an ambient pressure. A faulty function of the pressure accumulator can only be identified in the prior art with expensive sensors, for example, a reduction in gas pressure due to gas leakage.

The gear selector path diagnosis can preferably occur as a follow-up diagnosis occurring in time after a precharge pressure diagnosis and/or a clutch path diagnosis.

Given this background, the precharge pressure of the pressure accumulator can preferably be checked with the diagnosis module. For this, at least one or more reference values are stored in the diagnosis module, representing a reference accumulator pressure curve over time during a charging process. For the pressure accumulator diagnosis, a charging operation is performed, during which the clutch valve situated in the clutch path is fully opened, so that the pressure sensor can detect an actual accumulator pressure curve over time during the charging operation. For evaluating the actual accumulator pressure curve over time, the diagnosis module has an evaluating unit, with which a pressure accumulator fault condition can be identified if a significant deviation is present between the reference accumulator pressure curve and the actual accumulator pressure curve.

For the pressure accumulator diagnosis, the charging operation is carried out at constant charging speed of the hydraulics charging pump. In this way, the clutch path is filled with hydraulic fluid, and, in fact, up to a precharge pressure time at which the hydraulic pressure detected by the pressure sensor (i.e., the actual accumulator pressure) is as high as the (actual) precharge pressure of the pressure accumulator. In the further course of the charging process, the oil chamber of the pressure accumulator is filled starting from the precharge pressure time, and, in fact, during adjustment of the pressure piston and during further increase in the actual accumulator pressure.

A characteristic charging curve over time is produced in such a charging process. This may run between a diagnosis start time at which the pressure accumulator oil chamber is fully emptied and the aforementioned upper threshold value and it may be used for the pressure accumulator diagnosis: thus, the charging curve over time (i.e., the actual accumulator pressure curve) has a steep pressure gradient until it reaches the precharge pressure time and then a greatly reduced pressure gradient after the precharge pressure time. In the case of a proper pressure accumulator function, the actual precharge pressure detected at the precharge pressure time agrees with the structural design of the pressure accumulator precharge pressure, which is stored in the diagnosis module, making allowance for the strong temperature dependence.

In the evaluating unit of the diagnosis module, the actual accumulator pressure detected by the pressure sensor at the precharge pressure time is compared to the predefined reference precharge pressure of the pressure accumulator. If there is a significant deviation between the two values, an implausible precharge pressure is found in the pressure accumulator.

As already mentioned above, the diagnosis start takes place under the diagnosis start condition that the oil chamber of the pressure accumulator is fully emptied and an ambient pressure prevails in the hydraulic system. Upon reaching this diagnosis start condition, at least one hydraulic cylinder of the clutch and/or the gear selector is first activated until the actual accumulator pressure detected by the pressure sensor has been reduced to the ambient pressure on account of the removal of hydraulic fluid associated with the activating of the hydraulic cylinder. In this case, the pressure accumulator oil chamber is also automatically fully emptied.

In order to determine the precharge pressure time, the evaluating unit can assess the pressure gradient over time before and after the precharge pressure time and compare the results with each other, and ascertain the precharge pressure time from this, or determine whether or not a pressure accumulator fault is present.

In a dual clutch transmission, two clutches are present, each being connected by way of substantially identical clutch paths to the pressure accumulator. In this case, the aforementioned pressure accumulator diagnosis can be conducted twice, namely, in the course of a first partial diagnosis with the pressure sensor situated in the first clutch path and with the clutch valve closed in the second clutch path, and in the course of a second partial diagnosis with the pressure sensor situated in the second clutch path and with the clutch valve closed in the first clutch path. The first and second partial diagnoses are compared with each other in the evaluating unit. If identical pressure accumulator faults are present in both the first and second partial diagnosis, the evaluating unit identifies a pressure accumulator fault. On the other hand, the evaluating unit identifies a fault (i.e., a leak, for example) in one of the two clutch paths if different fault results are present in the two partial diagnoses.

In another embodiment, the diagnosis module can additionally perform its own clutch path diagnosis, which occurs as a follow-up diagnosis in time immediately after the precharge pressure diagnosis. For the clutch path diagnosis, the diagnosis charging operation performed during the precharge pressure diagnosis is continued until reaching a maximum accumulator pressure (i.e., the upper threshold value) and ended at a shut-off time. After the end of the charging operation, the evaluating unit compares the further actual accumulator pressure curve to memorized or stored reference values and assesses whether a fault-free or a fault-related, leak-related pressure drop is present in the accumulator pressure curve (detected by the pressure sensor).

It is preferable to perform the above clutch path diagnosis only insofar as a fault-free precharge pressure in the pressure accumulator is ensured. Thus, preferably the clutch path diagnosis can only be performed in the diagnosis module under the condition that a fault-free pressure accumulator precharge pressure is present during the precharge pressure diagnosis.

The advantageous embodiments and/or enhancements of the invention explained above and/or reproduced in the dependent claims may be used individually or also with each other in any given combination—except in cases of clear interdependency or incompatible alternatives, for example.

BRIEF DESCRIPTION OF THE DRAWINGS

The invention and its advantageous embodiments and enhancements as well as their advantages shall be explained more closely in the following with the aid of drawings.

Shown are:

FIG. 3 in a block diagram, the program components for the pressure accumulator and clutch path diagnosis in a diagnosis module; and FIG. 4 diagrams illustrating the pressure accumulator and clutch path diagnosis;

FIG. 5 in a block diagram, the program components required in the diagnosis module for the gear selector path diagnosis;

FIG. 14 in a block diagram, the program components required in the diagnosis module for the delivery volume flow diagnosis;

FIG. 15 diagrams illustrating the time functions during the delivery volume flow diagnosis; and FIG. 16 an analysis unit in which the fault signals generated in the fault memory units can be read out.

DETAILED DESCRIPTION

Figure 1:
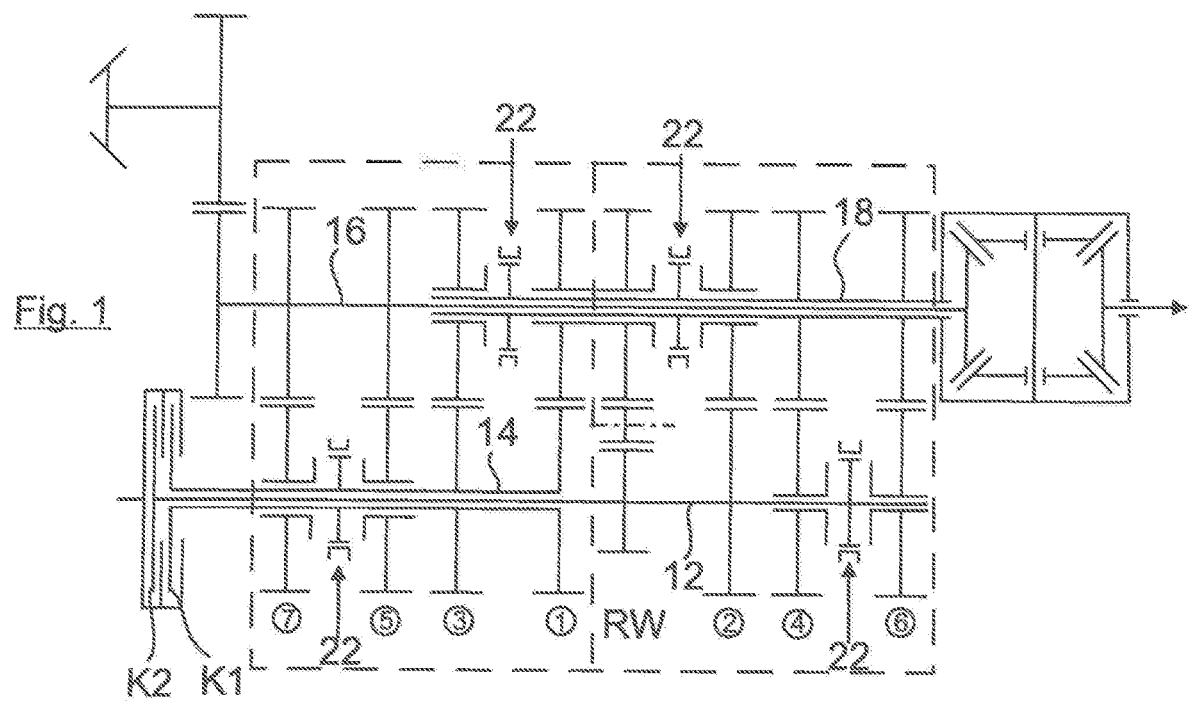
FIG. 1 a block diagram of a dual clutch transmission for a motor vehicle with seven forward gears and one reverse gear.

FIG. 1 shows in a schematic diagram a dual clutch transmission for a motor vehicle with all-wheel drive. The dual clutch transmission has seven forward gears (see the encircled numbers 1 to 7) and one reverse gear RW. The dual clutch transmission shall be described below only to the extent needed for an understanding of the invention. Thus, the dual clutch transmission has two input shafts 12, 14, arranged coaxially to each other and able to be connected across two hydraulically actuatable multidisk clutches K1, K2 alternating with the drive source, for example an internal combustion engine. The input shaft 14 is designed as a hollow shaft, in which the input shaft 12 is guided as a solid shaft. The two input shafts 12, 14, by way of gearwheel sets of the forward gears and the reverse gear, drive an output shaft 16, arranged axially parallel to them, and an intermediate shaft 18 configured as a hollow shaft. The gearwheel sets of the forward gears 1 to 7 comprise respective fixed gearwheels and loose gearwheels shiftable by hydraulically actuatable gear selectors. The gear selectors may be dual synchronous clutches, for example, which can shift two adjacent loose gearwheels, respectively, from a neutral position.

Figure 2B:
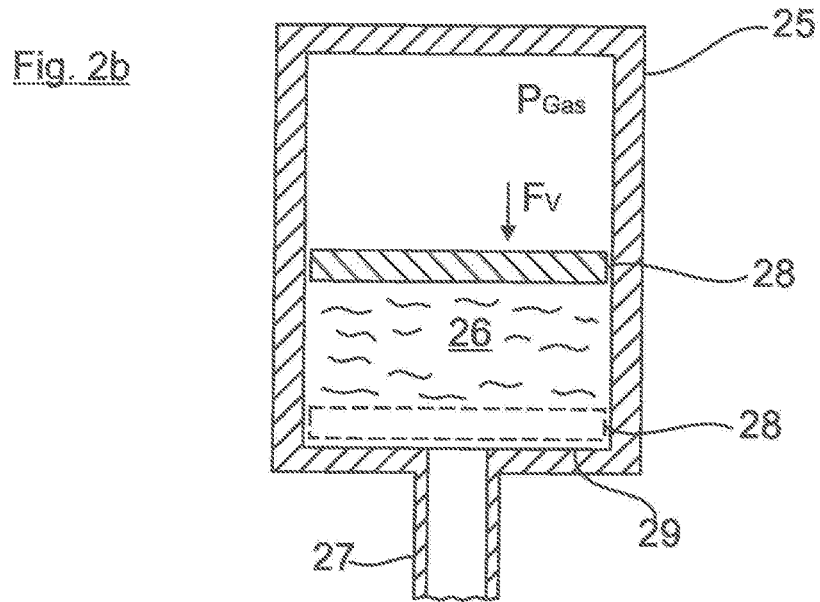
FIGS. 2a and 2b a hydraulic system of a dual clutch transmission in a block diagram as well as the rough schematic layout of a pressure accumulator.
Figure 2A:
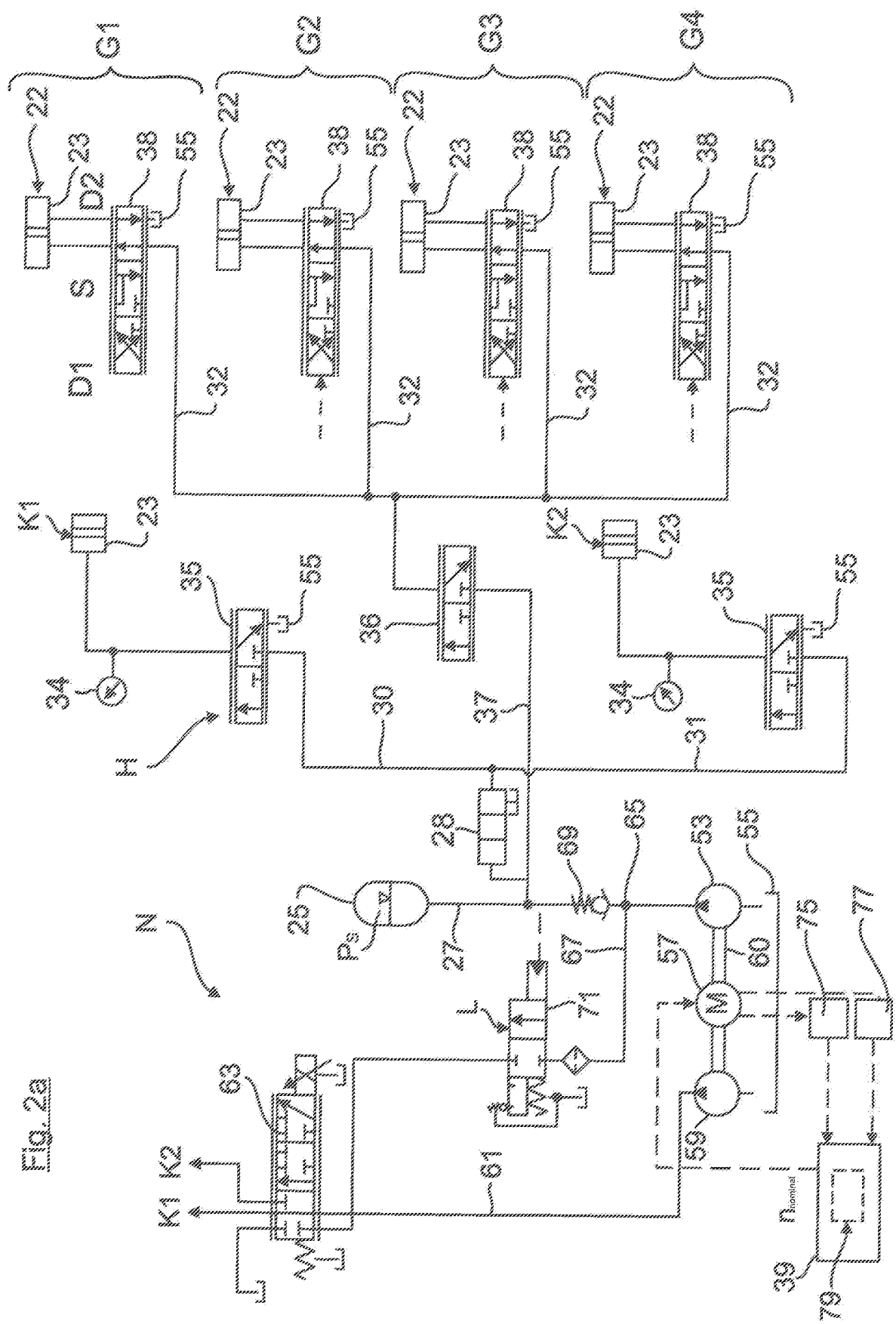

FIG. 2a shows the hydraulic system of the dual clutch transmission in a highly simplified block diagram. With the aid of the hydraulic system, the hydraulic cylinders 22, 23 of the clutches K1, K2 and the gear selectors are actuated. The hydraulic system according to FIG. 2a has a high-pressure circuit H and a low-pressure circuit N. In the high-pressure circuit H, the hydraulic cylinders 22, 23 of the clutches K1, K2 and the gear selectors that are connected therein can be subjected via a pressure accumulator 25 to an accumulator pressure $p_S$, which may be for example on the order of 30 bar. For this, a main line 27 connected to the pressure accumulator 25 is guided across clutch paths 30, 31 to the clutch hydraulic cylinders 23 and by way of gear selector paths 32 to the gear selector hydraulic cylinders 22. In the gear selector paths and clutch paths 30, 31, 32 there are arranged respective clutch or gear selector valves 35, 38. The clutch or gear selector valves 35, 38 are actuatable—in a manner not shown—by a central control unit 39. Furthermore, the control unit 39 communicates with pressure sensors 34 by signal engineering. The pressure sensors 34 respectively detect the hydraulic pressure present at the first clutch K1 and at the second clutch K2.

The hydraulic system furthermore has a charging pump 53, which is connected at the inlet side to an oil sump 55. The charging pump 53 can be actuated via an electric motor 57 by the control unit 39 to charge the pressure accumulator 25. Furthermore, the charging pump 53 is arranged together with a cooling pump 59 on a common drive shaft 60 driven by the electric motor 57. The cooling pump 59 is in communication at the outlet side with a low-pressure line 61 leading to a distributor valve 63. Depending on the position of the distributor valve 63, when there is a demand for cooling the hydraulic fluid can be returned to the first and/or second clutch K1, K2 and then to the oil sump 55.

FIG. 2a shows the main line 27 of the high-pressure circuit H at a branching point 65 to a bypass line 67, which is connected to the low-pressure line 61 of the low-pressure circuit N. Downstream from the branching point 65 is situated a check valve 69, which will be described later on. Furthermore, an accumulator charging valve 71 is integrated in the bypass line 67. Depending on the level of the accumulator pressure $p_S$ in the high-pressure circuit H, the accumulator charging valve 71 can be adjusted between the charging position L shown in FIG. 2a and a cooling position K.

The accumulator pressure $p_S$ in the high-pressure circuit H acts as a control pressure, with which the accumulator charging valve 71 can be adjusted with no additional outside energy, i.e., automatically. The accumulator charging valve 71 is designed so that it is moved into the charging position L as long as the accumulator pressure $p_S$ in the high-pressure circuit H falls short of a lower threshold value, such as 25 bar. Moreover, the accumulator charging valve 71 is moved automatically into its cooling position K as long as the accumulator pressure $p_S$ stays above an upper threshold value $p_{max}$, such as, for example, 28 bar.

Figure 11:
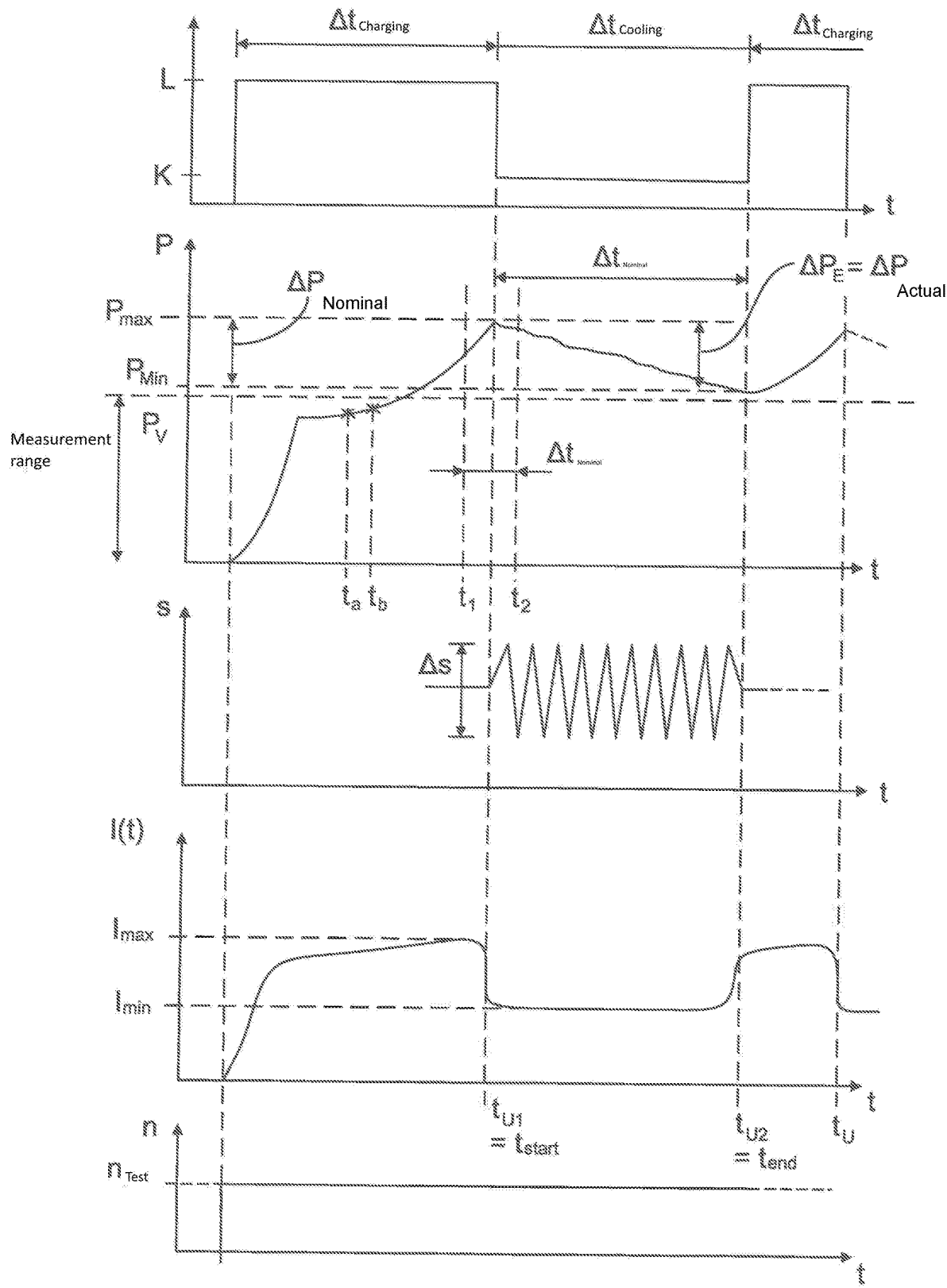
FIG. 11 diagrams illustrating the time functions during the switchover time diagnosis and during the valve spread diagnosis.

In driving operation, pressure losses occur due to activations of the clutches K1, K2 and the gear selectors G1 to G4. Furthermore, additional pressure losses occur due to a base leakage, that is, due to valve gaps or the like in the high-pressure circuit H. This reduces the accumulator pressure $p_S$ during the driving operation. In the event that the accumulator pressure $p_S$ falls below the lower threshold value $p_{min}$ (that is, a demand for pressure accumulator charging is present), the accumulator charging valve 71 automatically moves into its charging position L (FIG. 2). Upon recognizing the demand for pressure accumulator charging, the control unit 39 actuates the electric motor 57 with a nominal charging speed. In this way, the charging hydraulic pump 53 can charge the pressure accumulator 25. In such a charging operation, the charging hydraulic pump 53 works under large pumping load and therefore with correspondingly large actual current consumption $l_{max}$ (FIG. 11). If the accumulator pressure $p_S$ exceeds the upper threshold value $p_{max}$ (FIG. 11), that is, there is no longer a demand for pressure accumulator charging, the accumulator charging valve 71 will move automatically to its cooling position K. In the cooling position K, the charging hydraulic pump 53 delivers hydraulic oil by way of the now opened bypass line 67 to the low-pressure circuit N. At the same time, the high-pressure circuit H is closed pressure-tight via the check valve 69. Accordingly, the charging hydraulic pump 53 no longer works with high, but rather with reduced pumping load and, accordingly, less actual current consumption $l_{min}$ (FIG. 11).

As mentioned above, upon recognizing a demand for pressure accumulator charging, the control unit 39 actuates the electric motor 57 with a nominal charging speed. For recognizing such a demand for pressure accumulator charging, the invention does not employ a pressure sensor in the high-pressure circuit H or a position sensor in the accumulator charging valve 71. Instead, the control unit 39 has an evaluating unit. The evaluating unit is in signal communication with a current measuring device 75 integrated in the motor control, which detects an actual current consumption list of the electric motor 57, and with a rotational speed sensor 77, which detects the actual rotational speed nisi of the electric motor 57.

FIG. 2b shows the basic layout and the functioning of the pressure accumulator 25. Accordingly, the pressure accumulator 25 is a piston-cylinder unit with an oil chamber 26, connected to the hydraulic lines 27, 31, 32, and a prestressed pressure piston 27. The prestressing is accomplished here, for example, by a gas pressure, which is present on the pressure piston 27. Alternatively, the prestressing can also be achieved by a spring. When the oil chamber 26 is completely empty, the pressure piston 27 (indicated by the broken line in FIG. 2b) is pushed with a prestressing force $F_V$ against an end stop 29 of the pressure accumulator 25. That is, during a filling process, a hydraulic pressure is applied to overcome the prestressing force $F_V$, which is larger than a precharge pressure $p_V$ correlated with the prestressing force $F_V$.

FIG. 2b shows the pressure accumulator 25 in a partly filled condition, during which the hydraulic oil having built up the prestressing force $F_V$ is present with an accumulator pressure at the pressure piston 27. In the fully emptied condition, the hydraulic lines 27, 31 are not exposed to pressure by means of the pressure accumulator 25. Instead, ambient pressure $p_U$ prevails in the hydraulic lines 27, 31, 32. The automatic transmission is then ready to operate if all hydraulic lines 27, 31, 32 are filled with hydraulic oil and a hydraulic pressure is present in the hydraulic lines 27, 31, 32 that is greater than the precharge pressure $p_V$, and this by a specified pressure offset, so that the operating readiness is not lost again due to a base leakage immediately after switching off the charging pump 53.

In FIG. 2a, the control unit 39 comprises a diagnosis module 79, with which the charging behavior can be verified, in particular, the situation can be verified as to whether the actual precharge pressure $p_V$ in the pressure accumulator 21 agrees with a reference precharge pressure $p_{VRef}$ as indicated in the specification (i.e., dictated by design). The program components required for this are sketched in FIG. 3. Accordingly, the diagnosis module 79 has an evaluating unit 80, with which a temperature-dependent precharge pressure $p_{VRef}$ stored in memory in a characteristic field 86 is compared to a later described actual accumulator pressure $p_S(t_V)$ (FIG. 4). The actual accumulator pressure $p_S(t_V)$ is detected at a later described precharge pressure time $t_V$ by the pressure sensor 34. During the diagnosis operation, the clutch valve 35 is opened continuously in one of the clutch paths 30, 31, while the clutch valve 35 in the other clutch path is closed.

In the case of a proper pressure accumulator function, the actual accumulator pressure $p_S(t_V)$ detected at the precharge pressure time $t_V$ agrees with the reference precharge pressure $p_{VRef}$. On the other hand, if there is a significant precharge pressure deviation, the evaluating unit 80 establishes a precharge pressure fault, which is stored in a precharge pressure fault memory unit 81 (FIG. 3). Insofar as it is found that the pressure accumulator 25 is in order, another evaluating unit 82 (FIG. 4) of the diagnosis module 79 performs a clutch path diagnosis, to be described below.

In the following, the pressure accumulator diagnosis (i.e., precharge pressure diagnosis) and the clutch path diagnosis shall be explained with the aid of FIGS. 3 and 4: thus, in preparation of the pressure accumulator diagnosis, the oil chamber 26 of the pressure accumulator 25 is fully emptied and the actual accumulator pressure $p_S(t)$ in the hydraulic system is reduced to ambient pressure $p_U$, so that at a diagnosis start time $t_S$ (FIG. 4) the pressure accumulator diagnosis can begin. The above-described diagnosis start condition is accomplished by an actuating of the hydraulic cylinders 22, 23 of the clutches K1, K2 and the gear selectors G1 to G4, as indicated in the top travel range diagram of FIG. 4. Accordingly, the hydraulic cylinders 22, 23 are intermittently actuated by an energizing of the respective clutch or gear selector valves 35, 38 until the accumulator pressure $p_S$ detected by the pressure sensor 34 has been reduced to ambient pressure $p_U$ on account of the removal of hydraulic fluid associated with the hydraulic cylinder actuation. The presence of such an ambient pressure $p_U$ may be detected by the pressure sensor 34. Alternatively, position sensors 93 in the hydraulic cylinders 22, 23 can determine whether the respective hydraulic cylinder 22, 23 has moved by a travel range s (FIG. 4) or not. If not, it is inferred that ambient pressure $p_U$ is present in the hydraulic system.

Then, at time $t_S$ (FIG. 4), the diagnosis charging operation is started, during which the hydraulics charging pump 53 is actuated with a constant charging speed $n_L$ (FIG. 4, bottom diagram). As an example, at first the pressure sensor 34 situated in the first clutch path 31 is used to detect the actual accumulator pressure curve $p_S(t)$, as represented in FIG. 4, middle diagram. Consequently, the accumulator pressure $p_S$ increases up to the precharge pressure time $t_V$, at which the actual accumulator pressure $p_S(t_V)$ detected by the pressure sensor 34 has reached the pressure accumulator precharge pressure $p_V$.

As already indicated above, in a fault-free pressure accumulator function the actual accumulator pressure $p_S(t_V)$ detected at the precharge pressure time $t_V$ is identical to a reference precharge pressure $p_{VRef}$ (allowing for temperature dependencies). Upon significant deviation between the actual accumulator pressure $p_S(t_V)$ detected at the precharge pressure time $t_V$ and the reference precharge pressure $p_{VRef}$, the evaluating unit 80 establishes a precharge pressure fault. In the further diagnosis charging operation after the precharge pressure time $t_V$ the oil chamber 26 of the pressure accumulator 25 is filled, in fact, under movement of the pressure piston 27.

As emerges from the middle diagram of FIG. 4, the actual accumulator pressure curve $p_S(t)$ rises in the diagnosis charging operation until it reaches the precharge pressure $p_V$ in the pressure accumulator 25 (i.e., up to the precharge pressure time $t_V$) with a steep pressure gradient pi. In the further curve (i.e., after the precharge pressure time $t_V$), the actual accumulator pressure curve $p_S(t)$, on the contrary, rises only with a flatter pressure gradient $\dot{p}_2$. This characteristic charging curve for the pressure accumulator 25 is used as follows to determine the precharge pressure time $t_2$: the evaluating unit 80 thus detects the pressure gradient $\dot{p}_1$, $\dot{p}_2$ of the actual accumulator pressure curve $p_S(t)$. Upon detecting a significant gradient change between the pressure gradient $\dot{p}_1$ and $\dot{p}_2$, the evaluating unit 80 identifies the precharge pressure time $t_V$.

As long as no precharge pressure fault is identified in the above precharge pressure diagnosis, the clutch path diagnosis takes place immediately thereafter: for this, the diagnosis charging operation occurring during the pressure accumulator diagnosis is simply continued until the pressure sensor 34 has reached an upper threshold value $p_{max}$ (FIG. 4, middle diagram). The upper threshold value $p_{max}$ lies in FIG. 4, middle diagram, above the precharge pressure $p_V$ of the pressure accumulator 25 by a pressure difference $\Delta p$. After the end of the diagnosis charging operation, a second evaluating unit 82 compares a pressure gradient $\dot{p}_3$ of the actual accumulator pressure curve $p_S(t)$ to a reference pressure gradient $\dot{p}_{Ref}$, which is stored as a temperature function in a characteristic field 84 (FIG. 3) in the diagnosis module 79. The evaluating unit 82 ascertains from the comparison whether a fault-free or a fault-related, leak-related pressure drop is present in the actual accumulator pressure curve $p_S(t)$.

It should be emphasized that the clutch path diagnosis is only performed under the condition that the evaluating unit 80 finds no precharge pressure fault. With no fault in the pressure accumulator 25, faulty leakage can be distinctly ascribed to the clutch path 31. In both the pressure accumulator diagnosis and the clutch path diagnosis, the pressure regulating valve 36 situated in the connection line 37 connecting the main line 27 to the gear selector path 32 is closed.

For plausibility of the result obtained in the precharge pressure/clutch path diagnosis, the diagnosis operation explained above with the aid of the first clutch path 31 can be performed twice, namely, during a first partial diagnosis A with the aid of the pressure sensor 34 situated in the first clutch path 31 and with the clutch valve 35 closed in the second clutch path 32. Then the above diagnosis operation can be performed in the course of a second partial diagnosis B, with the pressure sensor 34 situated in the second clutch path 30 and with the clutch valve 35 closed in the first clutch path 31.

When the same faults are present in both the first partial diagnosis A and the second partial diagnosis B, the diagnosis module 79 can identify a pressure accumulator fault and also rule out with high probability a clutch path fault. When different fault results are present, the diagnosis module 79 can identify a leakage fault in one of the two clutch paths 30, 31.

FIG. 5 shows the program components of the diagnosis module 79 required for a gear selector path diagnosis in a greatly simplified block diagram. The gear selector path diagnosis is performed as a follow-up diagnosis immediately after the clutch path diagnosis in time (FIG. 3), under the condition that at least one clutch path 30, 31 with fault-free leakage has been identified in the clutch path diagnosis. The pressure sensor 34 of the clutch path 30, 31 considered to be fault-free (hereinafter called the reference clutch path) is used for the gear selector path diagnosis illustrated by FIGS. 5 and 6.

As emerges from FIG. 5, the diagnosis module 79 has a third evaluating unit 85, whose signal input receives an actual accumulator pressure $p_S(t)$ as detected by the pressure sensor 34 and an actual accumulator pressure gradient p. By means of the evaluating unit 85, the leakage behavior is checked separately for each of the gear selector paths 32. Any leakage faults detected are saved in the fault memory unit 87.

The gear selector path diagnosis shall now be described with the aid of FIGS. 5 and 6: thus, at first the diagnosis module 79 opens the clutch valve 35 situated in the reference clutch path 30 in order to detect the actual accumulator pressure curve $p_S(t)$. Furthermore, the pressure regulating valve 36 is opened in the connection line 37 of the hydraulic system in order to produce a pressure connection between the pressure sensor 34 situated in the reference clutch path 30 and the gear selector paths 32. After this, a diagnosis charging operation is carried out by activation of the charging hydraulic pump 53. In the diagnosis charging operation, the actual accumulator pressure $p_S(t)$ is increased up to the upper threshold value $p_{max}$ (FIG. 6) at the end time $t_{aus}$. After the end of the diagnosis charging operation, that is, at the end time $t_{aus}$ (FIG. 6), during a measurement time interval $\Delta t_M$, the pressure sensor 34 detects a pressure gradient $\dot{p}_{K+G}$ of the accumulator pressure curve $p_S(t)$. The evaluating unit 85 compares the pressure gradient $\dot{p}_{K+G}$ to a reference pressure gradient $p_{Ref}$ and assesses whether a fault-free or a fault-related pressure drop is present (that is, a gear selector leakage) in the accumulator pressure curve $p_S(t)$.

As shown in FIG. 2a, each of the gear selector valves 35* arranged in the gear selector paths 32 can move between a blocking valve position S and two through-flow valve positions D1, D2. The gear selector path diagnosis is carried out separately in the gear selector path 32 being checked for each of the through-flow valve positions D1 and D2. That is, in each gear selector path 32, the gear selector diagnosis is carried out both in the first through-flow valve position D1 of the gear selector valve 38 and in the second through-flow valve position D2 of the gear selector valve 38. The gear selector valves 38 in the other gear selector paths 32, on the other hand, remain switched into the blocking valve position S, in order to enhance the measurement accuracy during the diagnosis of the gear selector path 32 being checked. The pressure gradient $\dot{p}_{K+G}$ detected in the measurement time interval $\Delta t_M$ by the pressure sensor 34 therefore reflects the combined pressure drop in both the reference clutch path 30 and in the gear selector path 32 being checked, whose gear selector valve 38 is switched into one of the two through-flow positions D1, D2.

The reference pressure gradient $p_{Ref}$ is read out from a characteristic curve database, e.g., from the characteristic curve database 86 already shown in FIG. 3. In this case, the readable reference pressure gradient $p_{Ref}$ would correspond to a fault-free base leakage of the reference clutch path 30. The evaluating unit 85 detects not only the pressure gradient $p_{K+G}$, but also, in addition, absolute pressure values, that is, the actual accumulator pressure $p_S(t_{Start})$ at the start time $t_{Start}$ and the actual accumulator pressure $p_S(t_{End})$ at the measurement end time $t_{End}$ of the measurement time interval $\Delta t_M$. In this case, the evaluating unit 85 identifies a fault-free gear selector path 32 if the conditions are fulfilled, first of all, that a sufficiently large accumulator pressure difference is present between the start and end time $t_{Start}$, $t_{End}$ and secondly, that the pressure gradient $\dot{p}_{K+G}$ corresponds to the reference pressure gradient $\dot{p}_{Ref}$.

Figure 6:
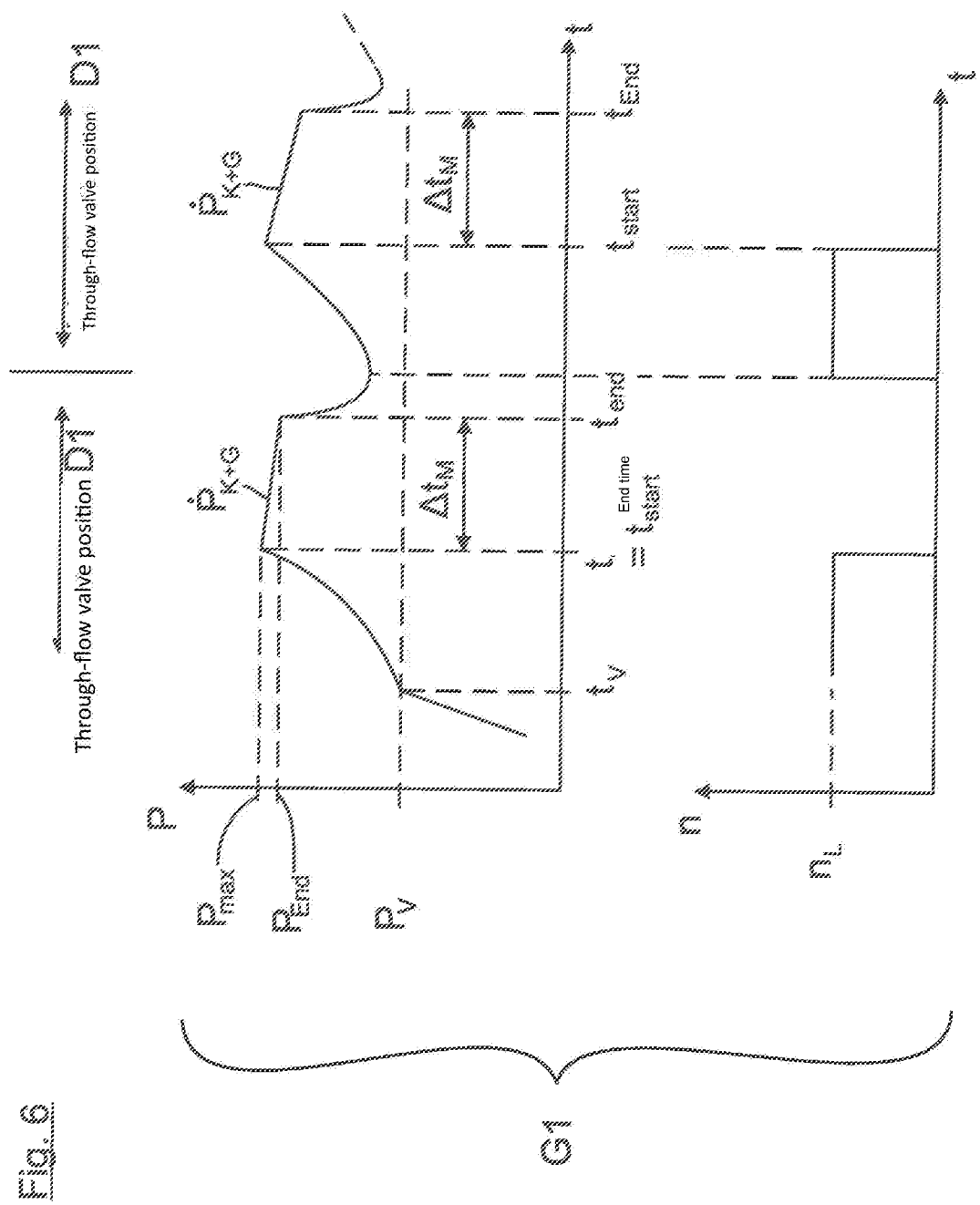
FIG. 6 diagrams illustrating the gear selector path diagnosis.
Figure 7:
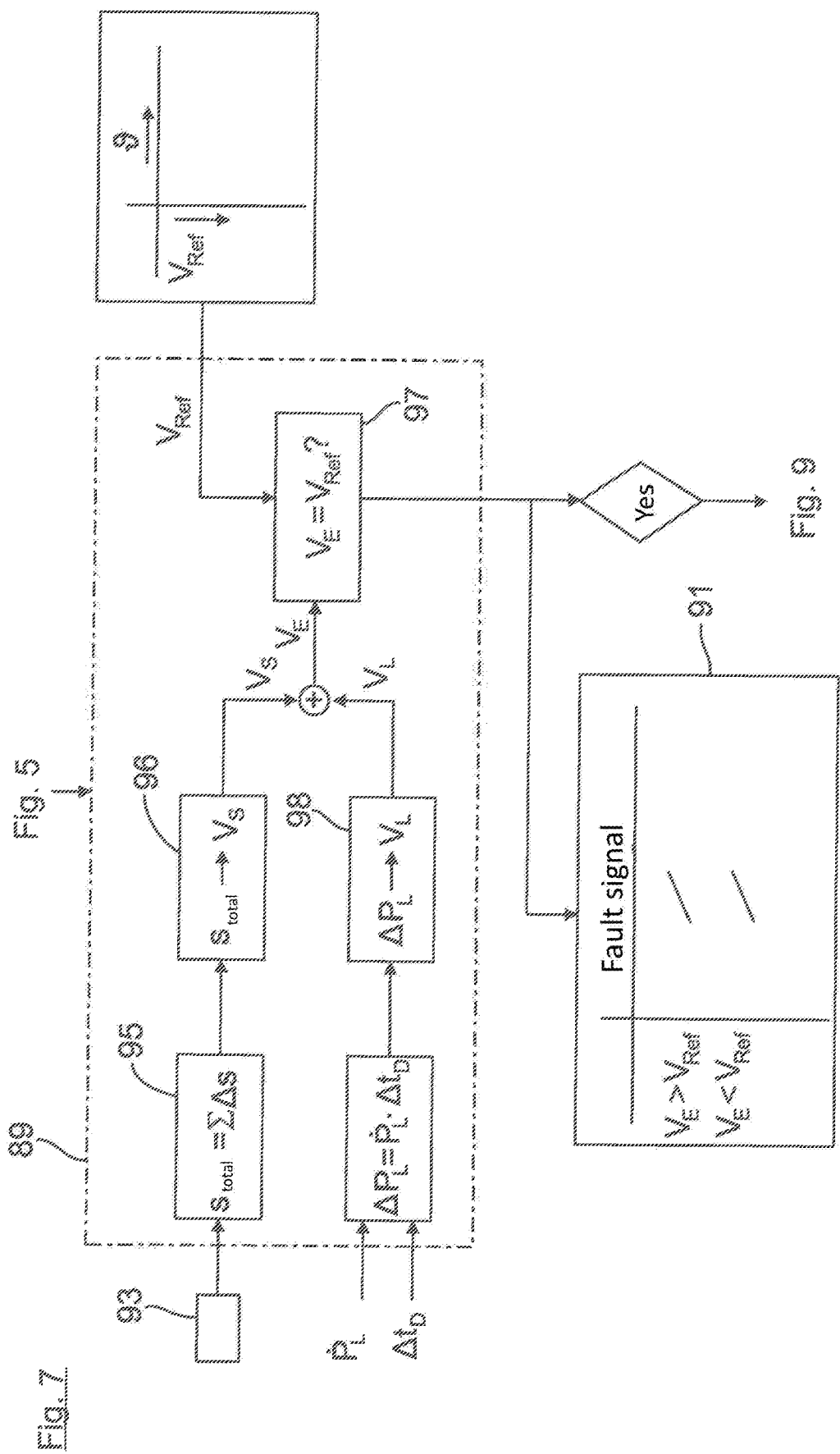
FIG. 7 in a block diagram, the program components required in the diagnosis module for the accumulator volume diagnosis.

FIG. 7 shows the program components of the diagnosis module 79 required for an accumulator volume diagnosis in a highly simplified block diagram. The accumulator volume diagnosis is performed as a follow-up diagnosis immediately after the gear selector diagnosis in time (FIGS. 5 and 6), provided that at least one gear selector path 32 of the gear selectors G1 to G4 has been identified as fault-free in the gear selector diagnosis and hence can be used as a reference gear selector path for the accumulator volume diagnosis.

As emerges from FIG. 7, the diagnosis module 79 has an evaluating unit 89, which, in a comparator component 97, compares a hydraulic fluid removal $V_E$ ascertained during the accumulator volume diagnosis to a reference accumulator volume $V_{ref}$. If a significant deviation is present, an accumulator volume fault is identified and saved in the fault memory unit 91. The reference accumulator volume $V_{ref}$ can be read out from an accumulator volume characteristic field of a database in which the reference values are saved as functions of temperature.

As further emerges from FIG. 7, the evaluating unit 89 is in signal communication with a position sensor 93 of the gear selector hydraulic cylinder 22 situated in the reference gear selector path 32. During the accumulator volume diagnosis, the gear selector valve 38 in the reference gear selector path 32 is actuated, whereupon the position sensor 93 detects the travel ranges Δs of the gear selector hydraulic cylinder 22. These are integrated in a travel range integrator 95 to form a total travel range $s_{ges}$. The total travel range $s_{ges}$ is converted in a converter component 96 into a total displacement volume $V_S$. To the total displacement volume $V_S$ is added a hydraulic fluid leakage volume $V_L$ which is drained during the accumulator volume diagnosis. The resulting hydraulic fluid removal $V_E$ is conveyed to the aforementioned comparator component 97.

Figure 8:
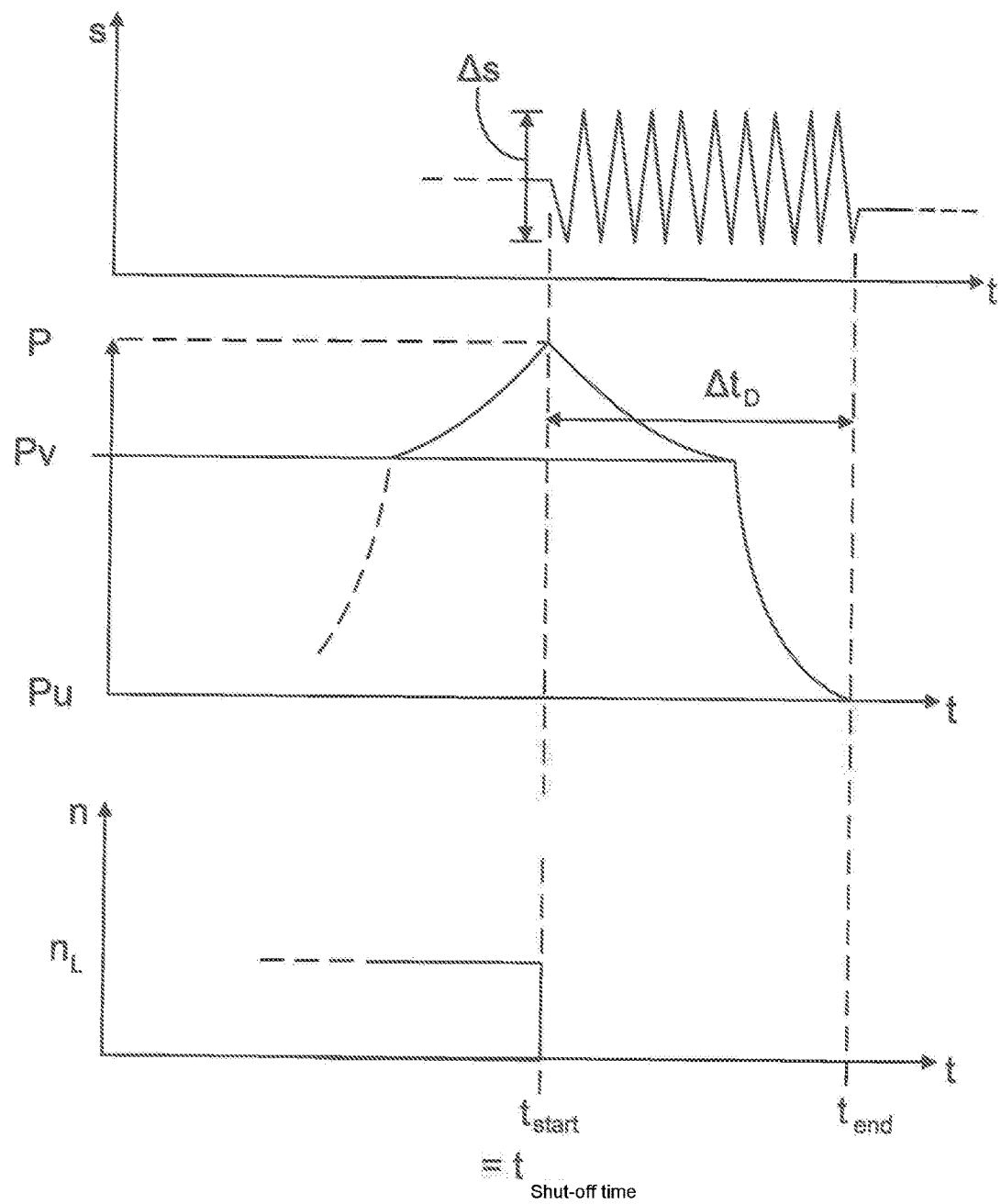
FIG. 8 diagrams illustrating the accumulator volume diagnosis.

The accumulator volume diagnosis is performed as follows: first of all, the pressure accumulator 25 is filled entirely with hydraulic fluid in a diagnosis charging operation. The diagnosis charging operation is a blind charging process that occurs at a given time t. After this, starting at a start time $t_{start}$ (coinciding with the shut-off time $t_{aus}$ in FIG. 8), the reference hydraulic cylinder 22 is intermittently actuated in a diagnosis time interval $\Delta t_D$ up until an ambient pressure $p_U$ is present in the hydraulic system due to the leakage and displacement volumes $V_L$ and $V_S$ removed from the hydraulic system. The ambient pressure $p_U$ is not measured directly by a pressure sensor, but instead found indirectly in the diagnosis module 79, namely at the end time $t_{end}$ (FIG. 8) of the diagnosis time interval $\Delta t_D$, when the position sensor 93 no longer detects any travel range Δs despite the through-flow valve position D1, D2 of the reference control valve 35.

During the pressure accumulator volume diagnosis, one of the clutch paths 30, 31 as the reference clutch path, as well as the reference gear selector path 32 leading to the reference hydraulic cylinder 22 are subjected to the accumulator pressure $p_S$ prevailing in the hydraulic system. On the other hand, the hydraulic cylinder 22 of the other gear selector path 32 and the other clutch path are decoupled from the accumulator pressure $p_S$.

The determination of the leakage volume $V_L$ may be carried out on the basis of the pressure gradient on the clutch path 30 as well as at the reference gear selector 22 as detected in the preceding diagnoses (e.g., the pressure gradient $\dot{p}_{K+G}$ from the gear selector path diagnosis according to FIGS. 5 and 6). The pressure gradient $\dot{p}_L$ is multiplied in the evaluating unit 89 by the diagnosis time interval $\Delta t_D$. The pressure difference $\Delta p_L$ thus obtained is converted in a converter 98 into the leakage volume $V_L$.

Figure 9:
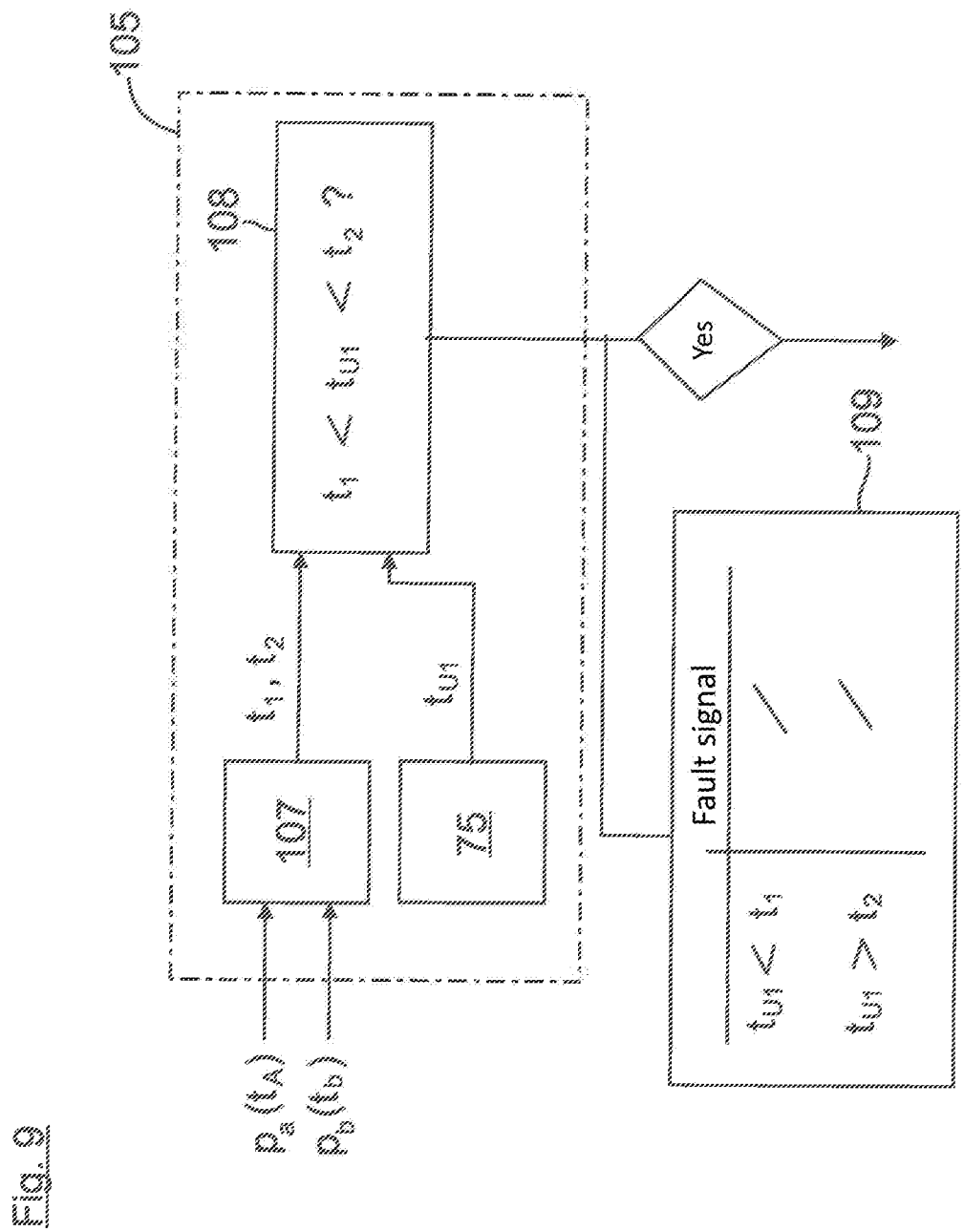
FIG. 9 in a block diagram, the program components required in the diagnosis module for the switchover time diagnosis.

FIG. 9 shows the program components of the diagnosis module 79 required for a switchover time diagnosis at the accumulator charging valve 71 in a highly simplified block diagram. The switchover time diagnosis is carried out as a follow-up diagnosis immediately after the accumulator volume diagnosis in time (FIGS. 7 and 8), and, in fact, under the condition that a plausible accumulator volume of the pressure accumulator 25 has been identified in the accumulator volume diagnosis.

As emerges from FIG. 9, the diagnosis module 79 has an evaluating unit 105, with which it is determined, in the course of the switchover time diagnosis, whether a first switchover time $t_{U1}$ is plausible, at which the accumulator charging valve 71 automatically switches from its charging position L to its non-charging position K, and whether a second switchover time $t_{U2}$ is plausible, at which the accumulator charging valve 71 automatically switches from its non-charging position K to its charging position. For this, the evaluating unit 105 determines whether the actual accumulator pressure $p_S(t)$ at the first switchover time $t_{U1}$ lies in the range of the upper pressure threshold value $p_{max}$. Furthermore, the evaluating unit 105 determines whether the actual accumulator pressure $p_S(t)$ at the second switchover time $t_{U2}$ lies in the range of the lower pressure threshold value $p_{min}$.

In order to detect the two switchover times $t_{U1}$ and $t_{U2}$, the current measuring device 75 of the electric motor 57 is used. The current measuring device 75 detects an actual current consumption l(t) of the electric motor 57. In this process, the control unit 39 establishes a switchover time from a high current consumption $l_{max}$ to a low current consumption $l_{min}$ as a first switchover time $t_{U1}$. A switchover time from the low current consumption $l_{min}$ to the high current consumption $l_{max}$ is established as the second switchover time $t_{U2}$.

In order to detect the actual accumulator pressure $p_S(t)$, the clutch path pressure sensor 34 is used. Its measurement range $\Delta p_{mess}$ (FIG. 11) lies in FIG. 11 outside, that is, below the pressure threshold values $p_{max}$ and $p_{min}$. Thus, a direct detecting of the actual accumulator pressure $p_S$ at the two switchover times $t_{U1}$ and $t_{U2}$ is not possible, since the actual accumulator pressure applied at the two switchover times lies outside the measurement range $\Delta p_{mess}$.

In FIG. 9, the actual accumulator pressure $p_S(t)$ is determined at the switchover times $t_{U1}$ and $t_{U2}$ by an estimation, namely, with the aid of an extrapolating component 107. In the extrapolating component 107, a time slot $\Delta t_{Soil}$ is estimated on the basis of the measured pressure values $p_a(t_a)$ and $p_b(t_b)$ in the accumulator pressure curve that still lie within the pressure sensor measurement range ($\Delta p_{mess}$). The first switchover time $t_{U1}$ lies within the time slot $\Delta t_{Soil}$ in the case of a proper accumulator charging valve operation. The time slot $\Delta t_{Soil}$ in FIGS. 9 and 11 is bounded by the two times $t_1$ and $t_2$. In the comparator component 108 which is connected in series, it is determined whether the first switchover time $t_{U1}$ lies within or outside the time slot $\Delta t_{Soil}$. If the first switchover time $t_{U1}$ lies outside the time slot $\Delta t_{Soil}$, a fault condition is identified and this is saved in the fault memory unit 109.

FIG. 9 shows only a partial diagnosis in the program components, during which it is determined whether or not the first switchover time $t_{U1}$ lies in the time slot $\Delta t_{Soil}$. In the same way, the evaluating unit 105 determines whether or not the second switchover time $t_{U2}$ lies within the estimated time slot.

Figure 10:
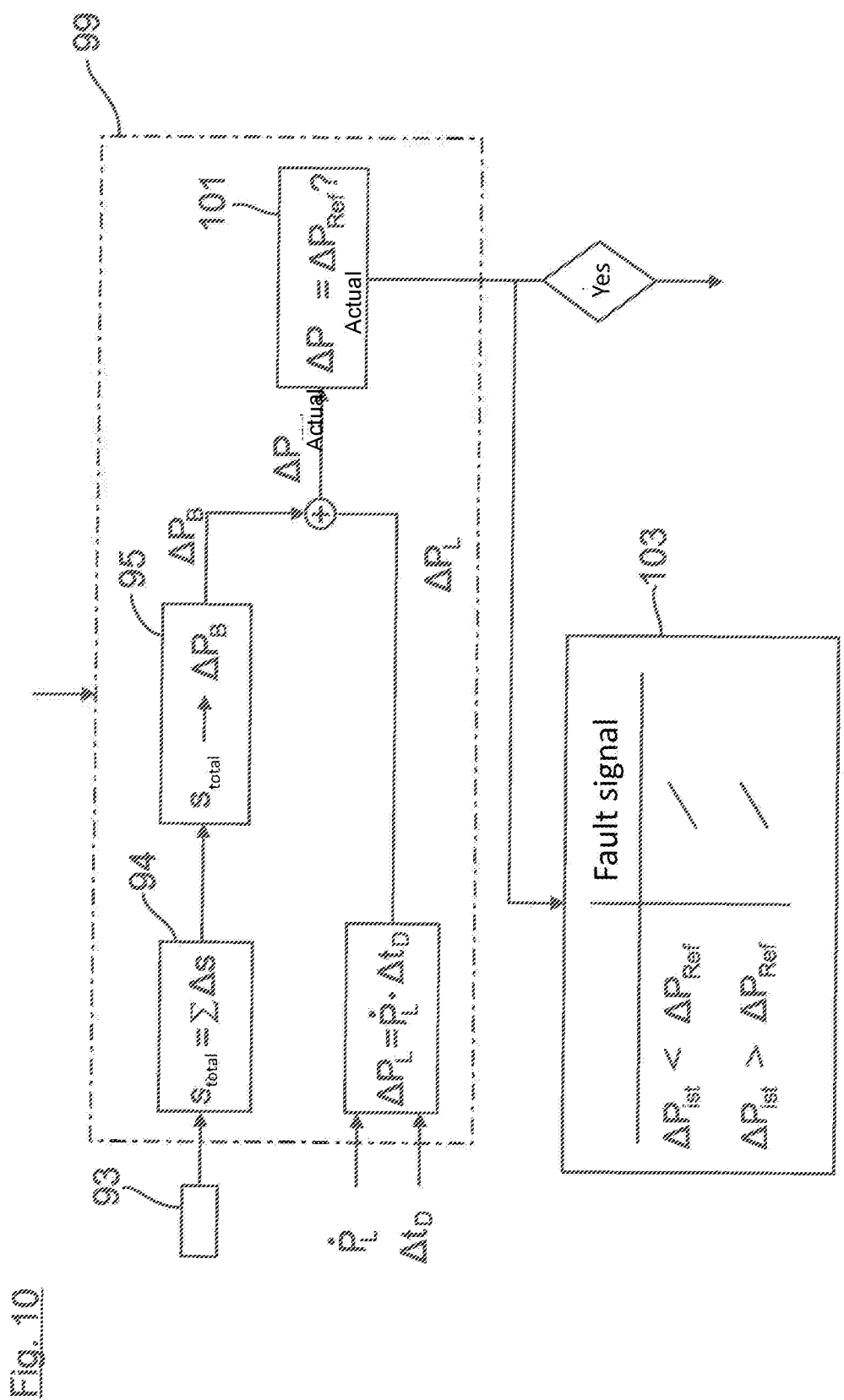
FIG. 10 in a block diagram, the program components required in the diagnosis module for the valve spread diagnosis.

FIG. 10 shows the program components of the diagnosis module 79 required for a valve spread diagnosis in a highly simplified block diagram. The valve spread diagnosis is performed as a follow-up diagnosis immediately after the switchover time diagnosis (FIG. 9), under the condition that a plausible switchover time $t_{U1}$ of the charging accumulator valve 71 has been identified.

The diagnosis module 79 in FIG. 10 has an evaluating unit 99, which determines during a valve spread diagnosis an actual valve spread $\Delta p_{ist}$ between the lower and the upper pressure threshold values $p_{min}$ and $p_{max}$. A comparator component 101 of the evaluating unit 99 compares the actual valve spread $\Delta p_{ist}$ to a nominal valve spread $\Delta p_{Ref}$. If a significant deviation is present, a fault condition is identified and saved in the fault memory unit 103.

To determine the actual valve spread $\Delta p_{ist}$, the evaluating unit 99 establishes a diagnosis time interval $\Delta t_D$. The diagnosis time interval $\Delta t_D$ starts with the first switchover time $t_{U1}$ and ends with the following second switchover time $t_{U2}$. Within the above defined diagnosis time interval $\Delta t_D$ the diagnosis module 79 activates a reference hydraulic cylinder 22, which, according to FIG. 11, is moved permanently, i.e., intermittently, back and forth during the diagnosis time interval $\Delta t_D$. By activating the reference hydraulic cylinder 22 and due to a system-internal hydraulic system leakage, an accumulator pressure drop $\Delta p_E$, corresponding to the actual valve spread $\Delta p_{ist}$, occurs during the diagnosis time interval $\Delta t_D$.

The determination of the accumulator pressure drop $\Delta p_E$, that is, the actual valve spread $\Delta p_{ist}$, is conducted with the aid of the program components shown in FIG. 10: accordingly, the position sensor 93 integrates the piston travel ranges $\Delta s$ during the diagnosis time interval $\Delta t_D$ in an integrator 94 to form a total travel range $s_{ges}$. From this, in a converter component 95, the pressure drop $\Delta p_B$ associated with the gear selector actuation is calculated. The pressure drop $\Delta p_B$ associated with the gear selector actuation is added in a summator with the leakage-related pressure drop $\Delta p_L$, from which the accumulator pressure drop $\Delta p_E$ during the diagnosis time interval $\Delta t_D$ results. The leakage-related pressure drop $\Delta p_L$ of the reference hydraulic cylinder 22 was already determined during previous diagnoses.

As emerges from FIG. 2a, a safety valve 28 actuated by the electronic control unit 39 is hooked up before the two clutch paths 30, 31. The safety valve 28 can be moved between a closed position and a through-flow position. In the closed position, the two clutch paths 30, 31 are pressure-decoupled from the pressure accumulator 25. In the through-flow position, the two clutch paths 30, 31 can be subjected to the accumulator pressure $p_S$. If the control unit 39 detects a malfunction of the clutch valve 35 in at least one of the clutch paths 30, 31, for safety reasons, the safety valve 28 can be moved to its closed position. In normal driving operation, the safety valve 28 is permanently in its through-flow position.

Figure 12:
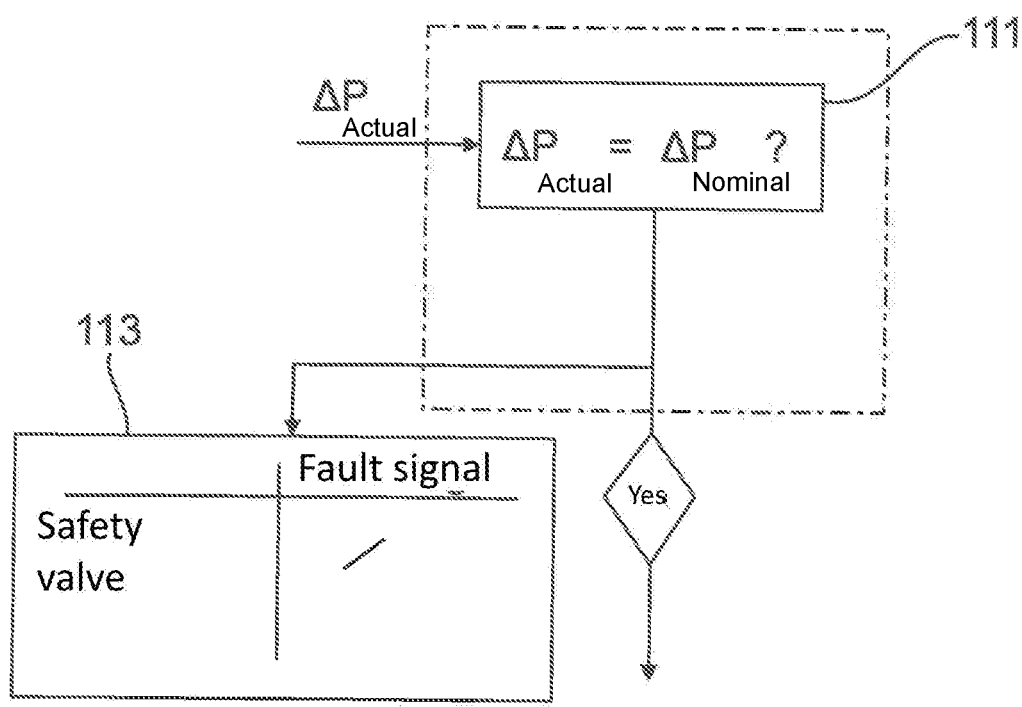
FIG. 12 in a block diagram, the program components required in the diagnosis module for the safety valve diagnosis.

FIG. 12 shows the program components of the diagnosis module 79 required for a safety valve diagnosis in a highly simplified block diagram. The safety valve diagnosis can be performed independently of other diagnosis steps. During the safety valve diagnosis, the safety valve 28 is switched at a diagnosis start time $t_{Start}$ (FIG. 13) from the through-flow position to the closed position, thereby establishing an actual pressure drop $\Delta p_{ist}$ downstream from the safety valve 28. The diagnosis module 79 has an evaluating unit 111, which compares this actual pressure drop $\Delta p_{ist}$ to a nominal pressure drop $\Delta p_{Soll}$. If a significant deviation is present, a fault condition is identified and saved in a safety fault memory unit 113.

The aforementioned clutch pressure sensor 34 can be used to determine the actual pressure drop $\Delta p_{ist}$.

Figure 13:
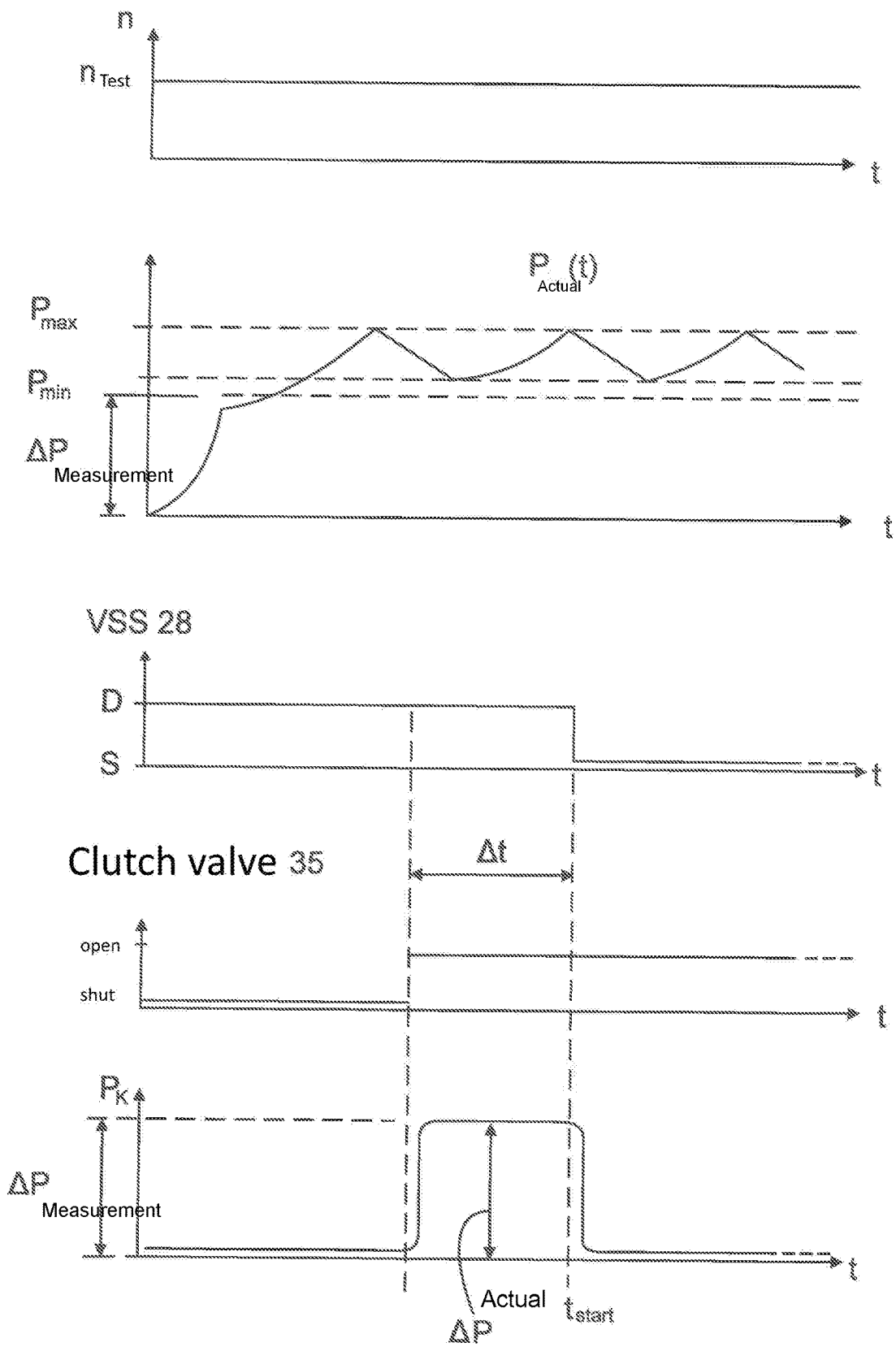
FIG. 13 diagrams illustrating the time functions of relevant parameters during the safety valve diagnosis.

The performance of the safety valve diagnosis shall be explained in the following with the aid of FIGS. 12 and 13: for proper measurement accuracy, the hydraulic pump 53 is actuated with a constant speed $n_{prüf}$, in order to assure a sufficiently large accumulator pressure $p_S$ in the high-pressure circuit H, which, according to FIG. 13, varies between the upper and lower pressure threshold values $p_{max}$ and $p_{min}$. The clutch valve 35 of a reference clutch path 30 or 31 is moved by a time offset $\Delta t$ before the aforementioned start time $t_{Start}$ to its through-flow position, so that the pressure sensor 34 can detect the actual pressure drop $\Delta p_{ist}$ between the clutch valve 35 and the clutch hydraulic cylinder 23. During the time offset $\Delta t$, the pressure sensor 34 reads out for the evaluating unit 111 (FIG. 12) not the actual hydraulic pressure on the clutch hydraulic cylinder 22, but rather an upper limit pressure of the measurement range $\Delta p_{mess}$.

At the diagnosis start time $t_{Start}$, the safety valve 28 is switched from its through-flow position D to its closed position S. The resulting pressure drop $p_{ist}$ is detected by the pressure sensor 34 and compared to the nominal pressure drop in the evaluating unit 111.

FIG. 14 shows the program components of the diagnosis module 79 required for the delivery volume flow diagnosis in a highly simplified block diagram. The delivery volume flow diagnosis is performed as a follow-up diagnosis immediately after the accumulator volume diagnosis (FIGS. 7 and 8), under the condition that a plausible accumulator volume of the pressure accumulator 25 was identified in the accumulator volume diagnosis.

As emerges from FIG. 14, a gear selector hydraulic cylinder 22 is used for the diagnosis that is in communication by way of the gear selector 32* with the pressure sensor 25. In front of the gear selector hydraulic cylinder 22 there is installed a gear selector valve 38, which can be actuated by the control unit 39 in order to adjust a hydraulic pressure applied to the gear selector hydraulic cylinder 22. The gear selector valve 38 can move between two through-flow positions D1, D2, in order to move a piston 33 in opposing piston strokes over the indicated travel ranges $s_1$, $s_2$ and with piston velocities $\dot{s}_1$, $\dot{s}_2$ in the hydraulic actuating cylinder 22. The piston 33 divides the hydraulic cylinder in FIG. 14 into a working space on the piston rod side and a working space facing away from the latter, both of these spaces being in communication with the gear selector valve 38 via hydraulic control lines 41. By means of the piston rod 43 of the gear selector hydraulic cylinder 22, a gear selector G1 (not shown) can be actuated. Upon such a gear selector actuation, the electronic control unit 39 controls the gear selector valve 38 in known manner into one of the flow positions D1, D2, in order to accomplish a movement of the piston rod. The piston stroke is associated with a removal of hydraulic fluid $V_1$, $V_2$ (displacement volume) from the hydraulic system. The particular displacement volume $V_1$, $V_2$ is known, based on the known internal geometry of the gear selector hydraulic cylinder 22. Furthermore, a position sensor 93 is provided, with which the piston velocity $\dot{s}_1$, $\dot{s}_2$ in the respective piston stroke can be detected.

The delivery volume flow diagnosis shall be described in the following with the aid of FIGS. 14 and 15: thus, at first the hydraulic pump 53 is deactivated in a pressure reducing time interval $\Delta t_R$ (FIG. 15) and at the same time the gear selector valve 38 is actuated intermittently by the electronic control unit 39, as shown in the middle travel range diagram of FIG. 15. In the pressure reducing time interval $\Delta t_R$ the gear selector hydraulic cylinder 22 is moved back and forth by the actuation of the gear selector valve 38 until the accumulator pressure $p_S(t)$ is reduced to the ambient pressure $p_U$ on account of leakage-related removal of hydraulic fluid and on account of motion-related removal of hydraulic fluid (that is, displacement volumes $V_1$, $V_2$). In this condition, the pressure accumulator 25 is entirely emptied. Immediately after this, the start ($t_{start}$) of a diagnosis time interval $\Delta t_D$ occurs. In the diagnosis time interval $\Delta t_D$ there occurs a charging operation of the hydraulic pump 53, during which it is actuated with different test speeds $n_1$ and $n_2$. At the same time, the control valve 35 is moved intermittently between its through-flow positions D1, D2. This causes the piston 33 in the gear selector hydraulic cylinder 22 to move back and forth in opposing piston strokes over piston travel ranges $s_1$, $s_2$ and with piston velocities $\dot{s}_1$, $\dot{s}_2$ in the gear selector hydraulic cylinder 22.

The position sensor 93 detects both the individual travel ranges $s_1$, $s_2$ per piston stroke and the piston velocities $\dot{s}_1$, $\dot{s}_2$ per piston stroke. Furthermore, the number a (FIG. 14) of piston strokes during the diagnosis time interval $\Delta t_D$ is detected. This data is sent to the signal input of a converter component 115, in which a mean piston velocity $\dot{s}_{mittel}$ is calculated from the number a of piston strokes detected.

From the mean piston velocity $\dot{s}_{mittel}$ an actual delivery volume flow $V_{ist}$ is calculated in the converter component 115. In a following evaluating unit 113'', which is connected by signal engineering, the actual delivery volume flow $V_{ist}$ is compared to a nominal delivery volume flow $V_{Soll}$, taking into account the particular test speed $n_1$ and $n_2$ during the diagnosis time interval $\Delta t_D$. If a significant deviation is found in the evaluating unit 113, a fault condition is identified and saved in the fault memory unit 117.

As emerges from FIG. 16, all fault memory units 81, 83, 87, 91, 103, 109, 117 are in signal communication with an analysis unit 120, in which the fault signals generated in the fault memory units can be read out. An evaluation matrix is stored in the analysis unit 120, in which the fault signals from the fault memory units 81, 83, 87, 91, 103, 109, 117 are assembled.

In regard to a comprehensive hydraulic system diagnosis, the analysis unit 120 uses the evaluation matrix to evaluate all fault signals in combination. Thus, in the analysis unit 120 there occurs a final comparison of fault signals with proper, i.e., fault-free function diagnoses, so that a qualified evaluation of the components installed in the hydraulic system becomes possible. The evaluation can be carried out without a dismantling of the hydraulic system and without any outside testing layouts or measurement equipment. In this way, there is a shortening of repair and maintenance time, a reliable detection of defective components, a reduction of repeat repairs, and a saving of analysis and testing stand capacities thanks to testing in the installed condition (in the vehicle) with no dismantling expense.

The invention claimed is:

1. A hydraulic system for an automatic transmission, comprising:
a dual clutch transmission, of a motor vehicle, with which hydraulic cylinders of at least one clutch and of gear selectors can be actuated, which hydraulic system has a pressure accumulator for providing an accumulator pressure in the hydraulic system, wherein a clutch valve that can be actuated by the control unit is arranged in a clutch path leading from the pressure accumulator to the clutch hydraulic cylinder, with which clutch valve a hydraulic pressure applied at the clutch hydraulic cylinder can be adjusted, and a gear selector valve that can be actuated by an electronic control unit is arranged in at least one gear selector path leading from the pressure accumulator to the gear selector hydraulic cylinder, with which gear selector valve the hydraulic pressure applied at the gear selector hydraulic cylinder can be adjusted, to which control unit is assigned a pressure sensor, with which the hydraulic pressure applied at the clutch hydraulic cylinder can be detected, and comprising a charging hydraulic pump, which delivers hydraulic fluid into the hydraulic system in a charging process, in order to increase an actual accumulator pressure, wherein the control unit has a diagnosis module, with which a diagnosis of the gear selector path can be carried out, in which the diagnosis module checks a leakage behavior in the gear selector path using the pressure sensor arranged in the clutch path and identifies a fault condition, which can be stored in memory in a gear selector path fault memory unit,
wherein the gear selector path diagnosis is conducted as a diagnosis following in time after a precharge pressure diagnosis and/or a clutch path diagnosis, and in that the gear selector path diagnosis occurs only under the condition that at least one clutch path with fault-free leakage is identified in the clutch path diagnosis, and in that the fault-free identified clutch path can be used as a reference clutch path for the gear selector diagnosis.

2. The hydraulic system as claimed in claim 1, wherein, for the gear selector path diagnosis, the diagnosis module opens the clutch valve situated in the clutch path, in order to detect with the pressure sensor an actual accumulator pressure curve, and produces a pressure connection between the gear selector valve situated in the gear selector path and the pressure sensor by opening a pressure regulating valve.

3. The hydraulic system as claimed in claim 2, wherein, to carry out the gear selector path diagnosis, a diagnosis charging operation takes place, during which the actual accumulator pressure is increased up to an upper threshold value (pmax) at an end time, and in that, after the end of the diagnosis charging operation, the pressure sensor detects a pressure gradient of the accumulator pressure curve, and in that a third evaluating unit compares the pressure gradient of the accumulator pressure curve to a reference pressure gradient and evaluates whether a fault-free or a fault-related pressure drop or gear selector leakage is present in the accumulator pressure curve.

4. The hydraulic system as claimed in claim 1, wherein the gear selector valve can be adjusted between a blocking valve position and two through-flow valve positions, and in that the gear selector path diagnosis is conducted with the gear selector valve in both its first and in its second through-flow valve position.

5. The hydraulic system as claimed in claim 1, wherein at least a first and a second gear selector path is provided, and in the gear selector path diagnosis is conducted separately for each gear selector path.

6. The hydraulic system as claimed in claim 5, wherein, for a gear selector path diagnosis performed on the first gear selector path, the gear selector valve situated in the second and any other gear selector paths is or are in the blocked position.

7. The hydraulic system as claimed in claim 3, wherein the pressure gradient in the accumulator pressure curve is detected within a measurement time interval whose start time corresponds to the end of the diagnosis charging operation or occurs immediately thereafter, and/or in that both the actual accumulator pressure at the measurement start time and the actual accumulator pressure at the measurement end time is detected.

8. The hydraulic system as claimed in claim 1, wherein a precharge pressure diagnosis can be performed with the diagnosis module, during which the diagnosis module checks a precharge pressure of the pressure accumulator using the pressure sensor arranged in the clutch path and identifies a fault condition, which can be stored in memory in a precharge pressure fault memory unit.

9. The hydraulic system as claimed in claim 8, wherein, in order to carry out the precharge pressure diagnosis, the diagnosis module starts a charging process at a start time in order to increase the actual accumulator pressure up to an upper threshold value, wherein the clutch valve situated in the clutch path is fully opened, in order to detect an actual accumulator pressure curve as a function of time, and in that the diagnosis module comprises an evaluating unit that identifies a fault condition upon the presence of a significant deviation between at least one reference value and the actual accumulator pressure curve, which can be stored in memory in a precharge pressure fault memory unit.

10. The hydraulic system as claimed in claim 8, wherein the pressure accumulator is a piston-cylinder unit, in which an oil chamber connected to the clutch path is acted upon by means of a prestressed pressure piston, and in that, when the oil chamber is fully empty, the pressure piston is pushed with a prestressing force against an end stop of the pressure accumulator and ambient pressure prevails in the hydraulic system, and in that, during a filling or charging process, in order to overcome the prestressing force, a hydraulic pressure needs to be applied to the pressure piston that is greater than the temperature-dependent precharge pressure correlated with the prestressing force.

11. The hydraulic system as claimed in claim 9, wherein the upper threshold value is larger by a pressure difference than the precharge pressure of the pressure accumulator, and in that, in the diagnosis charging operation, the actual accumulator pressure detected by the pressure sensor at a precharge pressure time reaches the precharge pressure of the pressure accumulator, and in that, in the further diagnosis charging operation, starting from the precharge pressure time, the oil chamber of the pressure accumulator is filled, under adjustment of the pressure piston and with further increasing of the actual accumulator pressure.

12. The hydraulic system as claimed in claim 11, wherein the evaluating unit of the diagnosis module compares the actual accumulator pressure detected by the pressure sensor at the precharge pressure time to a predefined reference precharge pressure of the pressure accumulator, and in that, when the pressure accumulator has a faultless function, the actual accumulator pressure detected at the precharge pressure time corresponds to the reference precharge pressure, and in that, when a significant precharge pressure deviation is present, the evaluating unit establishes a precharge pressure fault.

13. The hydraulic system as claimed in claim 11, wherein, in the diagnosis charging operation the actual accumulator pressure curve rises with a steep pressure gradient until it reaches the precharge pressure in the pressure accumulator, and in the further course, the actual accumulator pressure curve rises with a flatter pressure gradient, and in that the evaluating unit identifies the precharge pressure time when a significant gradient change is present between the two pressure gradients.

* * * * *